US009294177B2

(12) United States Patent
Wang et al.

(10) Patent No.: US 9,294,177 B2
(45) Date of Patent: *Mar. 22, 2016

(54) SYSTEM AND METHOD FOR TRANSMIT AND RECEIVE ANTENNA PATTERNS CALIBRATION FOR TIME DIVISION DUPLEX (TDD) SYSTEMS

(71) Applicant: Magnolia Broadband Inc., Englewood, NJ (US)

(72) Inventors: Sherwin J. Wang, Towaco, NJ (US); Haim Harel, New York, NY (US); Kenneth Kludt, San Jose, CA (US); Phil F. Chen, Denville, NJ (US)

(73) Assignee: MAGNOLIA BROADBAND INC., Englewood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,415

(22) Filed: Aug. 25, 2014

(65) Prior Publication Data

US 2015/0146584 A1 May 28, 2015

Related U.S. Application Data

(63) Continuation-in-part of application No. 14/281,358, filed on May 19, 2014, now Pat. No. 9,014,066.

(60) Provisional application No. 61/909,135, filed on Nov. 26, 2013, provisional application No. 61/946,273, filed on Feb. 28, 2014, provisional application No. 61/973,362, filed on Apr. 1, 2014.

(51) Int. Cl.
*H04B 7/005* (2006.01)
*H04B 7/06* (2006.01)
(Continued)

(52) U.S. Cl.
CPC ............... *H04B 7/0617* (2013.01); *H04B 1/56* (2013.01); *H04B 7/0665* (2013.01); *H04B 17/12* (2015.01); *H04B 17/21* (2015.01); *H04B 7/0682* (2013.01)

(58) Field of Classification Search
CPC ........................................................ H04B 1/50
USPC ........................................................ 370/278
See application file for complete search history.

(56) References Cited

U.S. PATENT DOCUMENTS 4,044,359 A  8/1977  Applebaum et al.
4,079,318 A  3/1978  Kinoshita
(Continued)

FOREIGN PATENT DOCUMENTS

EP  1 189 303  3/2002
EP  1 867 177  5/2010
(Continued)

OTHER PUBLICATIONS

Office Action issued by the United States Patent and Trademark Office for U.S. Appl. No. 13/630,146 dated Jan. 22, 2013.
(Continued)

*Primary Examiner* — Christopher R Crompton
(74) *Attorney, Agent, or Firm* — Pearl Cohen Zedek Latzer Baratz LLP

(57) ABSTRACT

A method and system for calibrating transmit and receive antenna patterns for time division duplex (TDD) is described. A station in a communications network comprises at least two antennas configured to operate together for both transmitting and receiving modes. A phase setting difference between the transmit and receive antenna patterns may be determined and used to determine a relative amplitude setting for the transmit antenna pattern and/or a relative amplitude setting for the receive antenna pattern.

21 Claims, 14 Drawing Sheets

(51) Int. Cl.
*H04B 1/56* (2006.01)
*H04B 17/12* (2015.01)
*H04B 17/21* (2015.01)

(56) References Cited

U.S. PATENT DOCUMENTS

| | | | |
|---|---|---|---|
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A | 3/1998 | Tangemann et al. | |
| 5,915,215 A | 6/1999 | Williams et al. | |
| 5,936,577 A | 8/1999 | Shoki et al. | |
| 5,940,033 A | 8/1999 | Locher et al. | |
| 6,018,317 A | 1/2000 | Dogan et al. | |
| 6,026,081 A | 2/2000 | Hamabe | |
| 6,046,655 A | 4/2000 | Cipolla | |
| 6,094,165 A | 7/2000 | Smith | |
| 6,101,399 A | 8/2000 | Raleigh et al. | |
| 6,163,695 A | 12/2000 | Takemura | |
| 6,167,286 A | 12/2000 | Ward et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,259,683 B1 | 7/2001 | Sekine et al. | |
| 6,297,772 B1 | 10/2001 | Lewis | |
| 6,321,077 B1 | 11/2001 | Saitoh et al. | |
| 6,335,953 B1 | 1/2002 | Sanderford et al. | |
| 6,370,378 B1 | 4/2002 | Yahagi | |
| 6,377,783 B1 | 4/2002 | Lo et al. | |
| 6,393,282 B1 | 5/2002 | Iimori | |
| 6,584,115 B1 | 6/2003 | Suzuki | |
| 6,647,276 B1 | 11/2003 | Kuwahara et al. | |
| 6,697,622 B1 | 2/2004 | Ishikawa et al. | |
| 6,697,633 B1 | 2/2004 | Dogan et al. | |
| 6,735,182 B1* | 5/2004 | Nishimori et al. | 370/294 |
| 6,834,073 B1 | 12/2004 | Miller et al. | |
| 6,842,460 B1 | 1/2005 | Olkkonen et al. | |
| 6,914,890 B1 | 7/2005 | Tobita et al. | |
| 6,927,646 B2 | 8/2005 | Niemi | |
| 6,934,541 B2 | 8/2005 | Miyatani | |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,154,960 B2 | 12/2006 | Liu et al. | |
| 7,177,663 B2 | 2/2007 | Axness et al. | |
| 7,190,964 B2 | 3/2007 | Damnjanovic et al. | |
| 7,257,425 B2 | 8/2007 | Wang et al. | |
| 7,299,072 B2 | 11/2007 | Ninomiya | |
| 7,391,757 B2 | 6/2008 | Haddad et al. | |
| 7,392,015 B1 | 6/2008 | Farlow et al. | |
| 7,474,676 B2 | 1/2009 | Tao et al. | |
| 7,499,109 B2 | 3/2009 | Kim et al. | |
| 7,512,083 B2 | 3/2009 | Li | |
| 7,606,528 B2 | 10/2009 | Mesecher | |
| 7,634,015 B2 | 12/2009 | Waxman | |
| 7,646,744 B2 | 1/2010 | Li | |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,876,848 B2 | 1/2011 | Han et al. | |
| 7,881,401 B2 | 2/2011 | Kraut et al. | |
| 7,898,478 B2 | 3/2011 | Niu et al. | |
| 7,904,086 B2 | 3/2011 | Kundu et al. | |
| 7,904,106 B2 | 3/2011 | Han et al. | |
| 7,933,255 B2 | 4/2011 | Li | |
| 7,970,366 B2 | 6/2011 | Arita et al. | |
| 8,078,109 B1 | 12/2011 | Mulcay | |
| 8,103,284 B2 | 1/2012 | Mueckenheim et al. | |
| 8,111,782 B2 | 2/2012 | Kim et al. | |
| 8,115,679 B2 | 2/2012 | Falk | |
| 8,155,613 B2 | 4/2012 | Kent et al. | |
| 8,194,602 B2 | 6/2012 | van Rensburg et al. | |
| 8,275,377 B2 | 9/2012 | Nanda et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 | 2/2013 | Stirling-Gallacher | |
| 8,504,098 B2 | 8/2013 | Khojastepour | |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,571,127 B2 | 10/2013 | Jiang et al. | |
| 8,588,844 B2 | 11/2013 | Shpak | |
| 8,599,955 B1 | 12/2013 | Kludt et al. | |
| 8,599,979 B2 | 12/2013 | Farag et al. | |
| 8,605,658 B2 | 12/2013 | Fujimoto | |
| 8,611,288 B1 | 12/2013 | Zhang et al. | |
| 8,644,413 B2 | 2/2014 | Harel et al. | |
| 8,649,458 B2 | 2/2014 | Kludt et al. | |
| 8,666,319 B2 | 3/2014 | Kloper et al. | |
| 8,670,504 B2 | 3/2014 | Naguib | |
| 8,744,511 B2 | 6/2014 | Jones, Iv et al. | |
| 8,754,810 B2 | 6/2014 | Guo et al. | |
| 8,767,862 B2 | 7/2014 | Abreu et al. | |
| 8,780,743 B2 | 7/2014 | Sombrutzki et al. | |
| 8,797,969 B1 | 8/2014 | Harel et al. | |
| 8,891,598 B1 | 11/2014 | Wang et al. | |
| 8,928,528 B2 | 1/2015 | Harel et al. | |
| 8,942,134 B1 | 1/2015 | Kludt et al. | |
| 8,976,845 B2 | 3/2015 | O'Keeffe et al. | |
| 8,995,416 B2 | 3/2015 | Harel et al. | |
| 9,014,066 B1* | 4/2015 | Wang et al. | 370/280 |
| 9,035,828 B2 | 5/2015 | O'Keeffe et al. | |
| 2001/0029326 A1 | 10/2001 | Diab et al. | |
| 2001/0038665 A1 | 11/2001 | Baltersee et al. | |
| 2002/0024975 A1 | 2/2002 | Hendler | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2002/0115474 A1 | 8/2002 | Yoshino et al. | |
| 2002/0181426 A1 | 12/2002 | Sherman | |
| 2002/0181437 A1 | 12/2002 | Ohkubo et al. | |
| 2003/0087645 A1 | 5/2003 | Kim et al. | |
| 2003/0114162 A1 | 6/2003 | Chheda et al. | |
| 2003/0153322 A1 | 8/2003 | Burke et al. | |
| 2003/0153360 A1 | 8/2003 | Burke et al. | |
| 2003/0186653 A1 | 10/2003 | Mohebbi et al. | |
| 2003/0203717 A1 | 10/2003 | Chuprun et al. | |
| 2003/0203743 A1 | 10/2003 | Sugar et al. | |
| 2004/0023693 A1 | 2/2004 | Okawa et al. | |
| 2004/0056795 A1 | 3/2004 | Ericson et al. | |
| 2004/0063455 A1 | 4/2004 | Eran et al. | |
| 2004/0081144 A1 | 4/2004 | Martin et al. | |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0142696 A1 | 7/2004 | Saunders et al. | |
| 2004/0147266 A1 | 7/2004 | Hwang et al. | |
| 2004/0156399 A1 | 8/2004 | Eran | |
| 2004/0166902 A1 | 8/2004 | Castellano et al. | |
| 2004/0198292 A1 | 10/2004 | Smith et al. | |
| 2004/0228388 A1 | 11/2004 | Salmenkaita | |
| 2004/0235527 A1 | 11/2004 | Reudink et al. | |
| 2004/0264504 A1 | 12/2004 | Jin | |
| 2005/0068230 A1 | 3/2005 | Munoz et al. | |
| 2005/0068918 A1 | 3/2005 | Mantravadi et al. | |
| 2005/0075140 A1 | 4/2005 | Famolari | |
| 2005/0085266 A1* | 4/2005 | Narita | 455/561 |
| 2005/0129155 A1 | 6/2005 | Hoshino | |
| 2005/0147023 A1 | 7/2005 | Stephens et al. | |
| 2005/0163097 A1 | 7/2005 | Do et al. | |
| 2005/0245224 A1 | 11/2005 | Kurioka | |
| 2005/0250544 A1 | 11/2005 | Grant et al. | |
| 2005/0254513 A1 | 11/2005 | Cave et al. | |
| 2005/0265436 A1 | 12/2005 | Suh et al. | |
| 2005/0286440 A1 | 12/2005 | Strutt et al. | |
| 2005/0287962 A1 | 12/2005 | Mehta et al. | |
| 2006/0041676 A1 | 2/2006 | Sherman | |
| 2006/0092889 A1 | 5/2006 | Lyons et al. | |

(56) References Cited

U.S. PATENT DOCUMENTS

| | | |
|---|---|---|
| 2006/0094372 A1 | 5/2006 | Ahn et al. |
| 2006/0098605 A1 | 5/2006 | Li |
| 2006/0111149 A1 | 5/2006 | Chitrapu et al. |
| 2006/0135097 A1 | 6/2006 | Wang et al. |
| 2006/0183503 A1 | 8/2006 | Goldberg |
| 2006/0203850 A1 | 9/2006 | Johnson et al. |
| 2006/0227854 A1 | 10/2006 | McCloud et al. |
| 2006/0264184 A1 | 11/2006 | Li et al. |
| 2006/0270343 A1 | 11/2006 | Cha et al. |
| 2006/0271969 A1 | 11/2006 | Takizawa et al. |
| 2006/0285507 A1 | 12/2006 | Kinder et al. |
| 2007/0041398 A1 | 2/2007 | Benveniste |
| 2007/0058581 A1 | 3/2007 | Benveniste |
| 2007/0076675 A1 | 4/2007 | Chen |
| 2007/0093261 A1 | 4/2007 | Hou et al. |
| 2007/0097918 A1 | 5/2007 | Cai et al. |
| 2007/0115882 A1 | 5/2007 | Wentink |
| 2007/0115914 A1 | 5/2007 | Ohkubo et al. |
| 2007/0152903 A1 | 7/2007 | Lin et al. |
| 2007/0217352 A1 | 9/2007 | Kwon |
| 2007/0223380 A1 | 9/2007 | Gilbert et al. |
| 2007/0249386 A1 | 10/2007 | Bennett |
| 2007/0298742 A1 | 12/2007 | Ketchum et al. |
| 2008/0043867 A1 | 2/2008 | Blanz et al. |
| 2008/0051037 A1 | 2/2008 | Molnar et al. |
| 2008/0081671 A1 | 4/2008 | Wang et al. |
| 2008/0095163 A1 | 4/2008 | Chen et al. |
| 2008/0108352 A1 | 5/2008 | Montemurro et al. |
| 2008/0125120 A1 | 5/2008 | Gallagher et al. |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0240314 A1 | 10/2008 | Gaal et al. |
| 2008/0247370 A1 | 10/2008 | Gu et al. |
| 2008/0267142 A1 | 10/2008 | Mushkin et al. |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1 | 5/2009 | Sherman et al. |
| 2009/0154419 A1 | 6/2009 | Yoshida et al. |
| 2009/0187661 A1 | 7/2009 | Sherman |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0279478 A1 | 11/2009 | Nagaraj et al. |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2009/0323608 A1 | 12/2009 | Adachi et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0087227 A1 | 4/2010 | Francos et al. |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1 | 8/2010 | Wax et al. |
| 2010/0222011 A1 | 9/2010 | Behzad |
| 2010/0232355 A1 | 9/2010 | Richeson et al. |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085465 A1 | 4/2011 | Lindoff et al. |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0250884 A1 | 10/2011 | Brunel et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0027000 A1 | 2/2012 | Wentink |
| 2012/0028638 A1 | 2/2012 | Mueck et al. |
| 2012/0028655 A1 | 2/2012 | Mueck et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0069828 A1 | 3/2012 | Taki et al. |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0092217 A1 | 4/2012 | Hosoya et al. |
| 2012/0100802 A1 | 4/2012 | Mohebbi |
| 2012/0115523 A1 | 5/2012 | Shpak |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0213065 A1 | 8/2012 | Koo et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0281598 A1 | 11/2012 | Struhsaker et al. |
| 2012/0314570 A1 | 12/2012 | Forenza et al. |
| 2012/0321015 A1 | 12/2012 | Hansen et al. |
| 2012/0327870 A1 | 12/2012 | Grandhi et al. |
| 2013/0010623 A1 | 1/2013 | Golitschek |
| 2013/0012134 A1 | 1/2013 | Jin et al. |
| 2013/0017794 A1 | 1/2013 | Kloper et al. |
| 2013/0023225 A1 | 1/2013 | Weber |
| 2013/0044877 A1 | 2/2013 | Liu et al. |
| 2013/0051283 A1 | 2/2013 | Lee et al. |
| 2013/0058239 A1 | 3/2013 | Wang et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0150012 A1 | 6/2013 | Chhabra et al. |
| 2013/0156016 A1 | 6/2013 | Debnath et al. |
| 2013/0156120 A1 | 6/2013 | Josiam et al. |

(56) References Cited

U.S. PATENT DOCUMENTS

| | | |
|---|---|---|
| 2013/0170388 A1 | 7/2013 | Ito et al. |
| 2013/0172029 A1 | 7/2013 | Chang et al. |
| 2013/0188541 A1 | 7/2013 | Fischer |
| 2013/0190006 A1 | 7/2013 | Kazmi et al. |
| 2013/0208587 A1 | 8/2013 | Bala et al. |
| 2013/0208619 A1 | 8/2013 | Kudo et al. |
| 2013/0223400 A1 | 8/2013 | Seo et al. |
| 2013/0229996 A1 | 9/2013 | Wang et al. |
| 2013/0229999 A1 | 9/2013 | Da Silva et al. |
| 2013/0235720 A1 | 9/2013 | Wang et al. |
| 2013/0242853 A1 | 9/2013 | Seo et al. |
| 2013/0242899 A1 | 9/2013 | Lysejko et al. |
| 2013/0242965 A1 | 9/2013 | Horn et al. |
| 2013/0242976 A1 | 9/2013 | Katayama et al. |
| 2013/0252621 A1 | 9/2013 | Dimou et al. |
| 2013/0272437 A1 | 10/2013 | Eidson et al. |
| 2013/0301551 A1 | 11/2013 | Ghosh et al. |
| 2013/0304962 A1 | 11/2013 | Yin et al. |
| 2013/0331136 A1 | 12/2013 | Yang et al. |
| 2013/0343369 A1 | 12/2013 | Yamaura |
| 2014/0010089 A1 | 1/2014 | Cai et al. |
| 2014/0010211 A1 | 1/2014 | Asterjadhi et al. |
| 2014/0029433 A1 | 1/2014 | Wentink |
| 2014/0071873 A1 | 3/2014 | Wang et al. |
| 2014/0079016 A1 | 3/2014 | Dai et al. |
| 2014/0086077 A1 | 3/2014 | Safavi |
| 2014/0086081 A1 | 3/2014 | Mack et al. |
| 2014/0098681 A1 | 4/2014 | Stager et al. |
| 2014/0119288 A1 | 5/2014 | Zhu et al. |
| 2014/0185501 A1 | 7/2014 | Park et al. |
| 2014/0185535 A1 | 7/2014 | Park et al. |
| 2014/0192820 A1 | 7/2014 | Azizi et al. |
| 2014/0204821 A1 | 7/2014 | Seok et al. |
| 2014/0241182 A1 | 8/2014 | Smadi |
| 2014/0242914 A1 | 8/2014 | Monroe |
| 2014/0269409 A1 | 9/2014 | Dimou et al. |
| 2014/0307653 A1 | 10/2014 | Liu et al. |
| 2015/0016438 A1 | 1/2015 | Harel et al. |
| 2015/0018042 A1 | 1/2015 | Radulescu et al. |
| 2015/0085777 A1 | 3/2015 | Seok |
| 2015/0139212 A1 | 5/2015 | Wang et al. |

FOREIGN PATENT DOCUMENTS

| | | |
|---|---|---|
| EP | 2 234 355 | 9/2010 |
| EP | 2 498 462 | 9/2012 |
| JP | 2009-182441 | 8/2009 |
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |
| WO | WO 2013/192112 | 12/2013 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.

(56) References Cited

OTHER PUBLICATIONS

Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/281,358 dated Dec. 16, 2014.
Office Action issued by the United States Patent and Trademark Office for U.S. Appl. No. 14/250,767 dated Dec. 26, 2014.
Notice of Allowance issued by the United States Patent and Trademark Office for U.S. Appl. No. 14/097,765 dated Dec. 31, 2014.
Office Action issued by the United States Patent and Trademark Office for U.S. Appl. No. 14/181,844 dated Jan. 5, 2015.
Office Action issued by the United States Patent and Trademark Office for U.S. Appl. No. 14/306,458 dated Jan. 9, 2015.
International Search Report and Written Opinion for International Application No. PCT/US14/65958 dated Jan. 13, 2015.
Notice of Allowance issued by the United States Patent and Trademark Office for U.S. Appl. No. 14/198,155 dated Jan. 26, 2015.
Notice of Allowance issued by the United States Patent and Trademark Office for U.S. Appl. No. 14/296,209 dated Jan. 27, 2015.
International Search Report and Written Opinion for PCT International Application No. PCT/US2014/064346 dated Jan. 29, 2015.
Mitsubishi Electric, "Discussion on Antenna Calibration in TDD", 3GPP Draft; R1-090043, $3^{rd}$ Generation Partnership Project (3GPP), Mobile Competence Centre; 650, Route Des Lucioles; F-06921 Sophia-Antipolis Cedex; France, No. Ljubljana; 20090107, Jan. 7, 2009, pp. 1-4.
Alcatel-Lucent Shanghai Bell et al., "Antenna Array Calibration for TDD CoMP", 3GPP Draft; R1-100427, $3^{d}$ Generation Partnership Project (3GPP), Mobile Competence Centre; 650, Route Des Lucioles; F06921 Sophia-Antipolis Cedex; France, vol. RAN WG1, No. Valencia, Spain; 20100118, Jan. 12, 2010, pp. 1-5.
Notice of Allowance issued by the United States Patent and Trademark Office for U.S. Appl. No. 13/925,454 dated Feb. 3, 2015.
Office Action issued by the United States Patent and Trademark Office for U.S. Appl. No. 14/173,640 dated Feb. 3, 2015.
International Search Report and Written Opinion for PCT International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference on, IEEE, Jun. 10, 2012, pp. 4095-4099.
Songtao et al., "A Distributed Adaptive GSC Beamformer over Coordinated Antenna Arrays Network for Interference Mitigation", Asilomar Conference on Signals, Systems and Computers, Conference Record, IEEE Computer Society, US, Nov. 4, 2012, pp. 237-242.
International Search Report and Written Opinion for PCT International Application No. PCT/US2014/065635 dated Feb. 13, 2015.
Notice of Allowance issued by the United States Patent and Trademark Office for U.S. Appl. No. 14/171,736 mailed Feb. 20, 2015.
Office Action issued by the United States Patent and Trademark Office for U.S. Appl. No. 14/320,920 dated Feb. 23, 2015.
Office Action issued by the United States Patent and Trademark Office for U.S. Appl. No. 13/775,886 dated Mar. 23, 2015.
Notice of Allowance issued by the United States Patent and Trademark Office for U.S. Appl. No. 14/449,431 dated Mar. 23, 2015.
Notice of Allowance issued by the United States Patent and Trademark Office for U.S. Appl. No. 14/273,866 dated Mar. 25, 2015.
Office Action issued by the United States Patent and Trademark Office for U.S. Appl. No. 14/517,114 dated Apr. 6, 2015.
Notice of Allowance issued by the United States Patent and Trademark Office for U.S. Appl. No. 13/925,454 dated Apr. 14, 2015.
Office Action issued by the United States Patent and Trademark Office for U.S. Appl. No. 14/543,357 dated Apr. 23, 2015.

(56) References Cited

OTHER PUBLICATIONS

Office Action issued by the United States Patent and Trademark Office for U.S. Appl. No. 14/450,625 dated Apr. 28, 2015.
Office Action issued by the United States Patent and Trademark Office for U.S. Appl. No. 14/250,767 dated Apr. 29, 2015.
Office Action issued by the United States Patent and Trademark Office for U.S. Appl. No. 14/181,844 dated May 13, 2015.
Notice of Allowance issued by the United States Patent and Trademark Office for U.S. Appl. No. 13/775,886 dated May 26, 2015.
Office Action issued by the United States Patent and Trademark Office for U.S. Appl. No. 14/320,920 dated May 29, 2015.
Office Action issued by the United States Patent and Trademark Office for U.S. Appl. No. 14/481,319 dated Jun. 12, 2015.
Notice of Allowance issued by the United States Patent and Trademark Office for U.S. Appl. No. 14/505,655 dated Jun. 17, 2015.
Office Action issued by the United States Patent and Trademark Office for U.S. Appl. No. 14/472,759 dated Jun. 18, 2015.
Office Action issued by the United States Patent and Trademark Office for U.S. Appl. No. 14/042,020 dated Jun. 19, 2015.
Notice of Allowance issued by the United States Patent and Trademark Office for U.S. Appl. No. 14/480,920 dated Jun. 22, 2015.
International Search Report and Written Opinion for PCT International Application No. PCT/US2014/062116 dated Jun. 22, 2015.
International Search Report and Written Opinion for PCT International Application No. PCT/US2014/063304 dated Jul. 8, 2015.
Bandyopadhyay, S. et al., "An Adaptive MAC Protocol for Wireless Ad Hoc Community Network (WACNet) Using Electronically Steerable Passive Array Radiator Antenna", Globecom '01 : IEEE Global Telecommunications Conference; San Antonio, Texas, USA, Nov. 25-29, 2001, IEEE Operations Center, Piscataway, NJ, vol. 5, Nov. 25, 2001, pp. 2896-2900.
Du, Yongjiu et al., "iBeam: Intelligent Client-Side Multi-User Beamforming in Wireless Networks", IEEE INFOCOM 2014—IEEE Conference on Computer Communications, IEEE, Apr. 27, 2014, pp. 817-825.
Office Action issued by the United States Patent and Trademark Office for U.S. Appl. No. 13/888,057 dated Jul. 9, 2015.
Office Action issued by the United States Patent and Trademark Office for U.S. Appl. No. 14/173,640 dated Jul. 16, 2015.
Office Action issued by the United States Patent and Trademark Office for U.S. Appl. No. 14/517,114 dated Jul. 28, 2015.
Office Action issued by the United States Patent and Trademark Office for U.S. Appl. No. 14/672,634 dated Aug. 12, 2015.
Notice of Allowance issued by the United States Patent and Trademark Office for U.S. Appl. No. 14/543,357 dated Sep. 2, 2015.
Office Action issued by the United States Patent and Trademark Office for U.S. Appl. No. 14/450,625 dated Sep. 10, 2015.
Office Action issued by the United States Patent and Trademark Office for U.S. Appl. No. 14/320,920 dated Sep. 21, 2015.
Office Action issued by the United States Patent and Trademark Office for U.S. Appl. No. 14/181,844 dated Sep. 25, 2015.

\* cited by examiner

Figure 11 Channels including transmit and receive paths

SYSTEM AND METHOD FOR TRANSMIT AND RECEIVE ANTENNA PATTERNS CALIBRATION FOR TIME DIVISION DUPLEX (TDD) SYSTEMS

CROSS REFERENCE TO RELATED APPLICATIONS

This application is a continuation-in-part of U.S. patent application Ser. No. 14/281,358 filed on May 19, 2014, which claims the benefit of U.S. Provisional Application No. 61/909,135 filed on Nov. 26, 2013 and of U.S. Provisional Application No. 61/946,273 filed on Feb. 28, 2014. This application also claims the benefit of U.S. Provisional Application No. 61/909,135 filed on Nov. 26, 2013, U.S. Provisional Application No. 61/946,273 filed on Feb. 28, 2014 and U.S. Provisional Application No. 61/973,362 filed Apr. 1, 2014. All of the above applications are incorporated herein by reference in their entirety.

FIELD OF THE INVENTION

The present invention relates generally to wireless communication systems, and more specifically, to such systems configured to calibrate transmit and receive antenna patterns thereof.

BACKGROUND OF THE INVENTION

Prior to setting forth a short discussion of the related art, it may be helpful to set forth definitions of certain terms that will be used hereinafter.

The term "time division duplex" (TDD) as used herein, is defined for the wireless communication systems is referred to in general for systems using the same frequency spectrum for methods of communications in a time division manner (for example, WiFi, and TDD-long term evolution (LTE) systems).

The term multiple input multiple outputs (MIMO) communication system as defined herein is a communication system that may be used to improve the spectral efficiency, for example, by applying multiple inputs multiple outputs (MIMO) schemes, beam-forming, or nulling (interference mitigation/management). These operations usually require transmitter to have the knowledge of channel state information (CSI) so that a set of pre-coding weights may be set to the multiple data streams to exploit the channels for the multiple spatial channel transmission or to the same data stream to perform the beam-forming or nulling.

Typically, the receiver can feed the CSI or even the preferred pre-coding matrix (index) back to the transmitter. These feedbacks can consume some available bandwidth of the transmission in the opposite direction and reduce the data throughput. If transmission in both directions operate in the same spectrum, like TDD systems, the channels through the air are reversible and the channel information can be estimated by the receive device and then applied to the device's transmission. However, a complete transmission channel should be from the transmitter baseband to the receiver baseband, which includes various components inside the transmitter (e.g., digital to analog converter (DAC), up converter, power amplifier, filter) and receiver such as duplexer, linear amplifier (LNA), down converter, filter, analog to digital converter (ADC). The transmit path and receive path may thus experience very different gain/loss and delays behavior, due to the different components used in both paths. Applying channel reciprocity without considering the different delay and gain/loss factors between the transmit/receive paths are therefore not valid and may not be accurate enough for the use by devices in TDD systems. These parameters may be factory calibrated. However, this calibration may be tedious and costly. In addition, one important element that jeopardizes reciprocity is antennas, which project slightly different radiation patterns at up and down links, due to differences in the Voltage Standing Wave Ratio (VSWR) in both directions. Antenna VSWR may not be practically calibrated in the factory, due to the cost and time of such procedures.

Methods other than factory-calibration known in the art are capable of self-calibrating on transmit and receive paths of the device used in TDD systems. However, these methods may need an extra receive path with attenuator to calibrate transmit/receive (Tx/Rx) paths precisely on various power levels. This may limit the use of the known methods for the devices that are not equipped with the extra receive path.

SUMMARY OF THE INVENTION

According to embodiments of the invention, a calibration method is provided to improve TDD system performance for effectively overcoming the aforementioned difficulties inherent in the art.

Embodiments of the present invention provide calibration of transmit and receive antenna patterns (e.g., beam peaks and nulls) for the devices in TDD systems, in which the channel reciprocity may be utilized so that the feedback of channel state information can be reduced or eliminated for beam-forming, nulling (e.g., interference mitigation) operations.

Some of the TDD operations, for example, beam-forming and nulling (e.g., interference mitigation/management) of a communication device may not need the complete calibration information of the device's Tx and Rx paths for using channel reciprocity. Instead, matching Tx and Rx antenna pattern (peak and null), e.g., finding the weighting offset between the two antenna patterns, may be sufficient for the TDD device to take advantage of the channel reciprocity on certain applications. Embodiments of the invention provide a method for calibrating a device's transmit and receive antenna patterns (e.g., obtaining the weighting offset for the two antenna patterns), disclosed herein for a TDD device (for example, WiFi) to enable the use of the channel reciprocity. Embodiments of this method, which may be termed calibration, may be used in a radiation test or in the field using live signals. When field processing is used, embodiments of the method may be done in a relatively static, stable and reliable environment e.g., Line-Of-Sight environment, high signal to noise plus interference (SINR), low mobility, minimal interference level, repetitive measurements that allow for averaging, and filtering out of elements that may distort the accuracy of the said calibration.

According to an embodiment of the invention, communication devices are provided in a TDD system. The communication devices may include mobile devices such as a user equipment (UE). A UE may include any end user device with wireless connectivity such as a smart telephone, a laptop or a tablet personal computer (PC). The communication devices are not limited to UEs and may comprise any station in a communication network. The communication devices may include a plurality of M antennas for beam-forming or nulling operations, for example having tunable phases and optionally also adjustable amplitude. Each antenna may be used for both transmission and receiving. A communication device in a system according to embodiments of the invention may also comprise a plurality of radio circuits configured to transmit and receive via said antennas using TDD, for example by transmitting and receiving on a common channel. The device may also comprise a computer processor such as a baseband processor configured to calculate a weight setting difference between the transmit and the receive antenna pattern. The antenna pattern may be a peak-null pattern of the plurality of antennas operating together. In some embodiments one or more components such as the baseband processor and radio circuits may be configured to carry out all or part of the present invention.

According to one embodiment of this invention, a communication device may perform a calibration processes to find the weight (for example, the relative phase setting or the relative amplitude setting or both) difference for matching transmit and receive antenna patterns (peaks and nulls) so that the channel reciprocity may be applied in the TDD system.

Embodiments of the invention also provide a method and system for configuring a station in a communications network comprising at least two antennas configured to operate together for both transmitting and receiving modes. A phase setting difference between the transmit and receive antenna patterns of said at least two of said antennas may be calculated or determined. This phase setting difference may be used to calculate or determine a relative amplitude setting for the transmit antenna pattern or a relative amplitude setting for the receive antenna pattern or both.

Embodiments of the invention also provide a method and system for configuring a station in a communications network as described above, in which a predetermined phase difference between receive and transmit antenna patterns is used to determine a relative amplitude setting for the transmit antenna pattern or a relative amplitude setting for the receive antenna pattern or both. One or both of these relative amplitude settings may be determined in order to achieve a null in a signal received from or transmitted to another station by said at least two antennas.

According to embodiments of the invention, a time division (TD) user equipment (UE) or a Wi-Fi station may select base transmitter station or access point (e.g. selecting SSID) signal, in a reliable environment as indicated above, and perform peak and null tuning on both transmissions by iteratively manipulating phases and amplitudes using a quality indicator, so that the maximum/the minimum is achieved.

A quality indicator may be data rate; so peak may be defined as amplitudes and phases setting to the two or more antennas which maximizes data rate, and null—as ones which minimize it; this may be applied to both to up and down links.

To calibrate the transmit beam, the station may upload a large file (for example with a constant packet length) at the same location for the receive beam calibration. For the receive path, peak/null may be established also via received signal level measurement, and therefore an iterative process may not be required.

Embodiments of the invention may start with an arbitrary phase (amongst two or more transmitting antenna) and equal amplitudes, and check the upload data rate (or the number of re-transmission time) until steady, then repeat the data rate measurements after changing to a new relative phase. The same may be done with relative amplitude. The transmit beam peak and null may then be found.

During the calibration, at WiFi protocol, if a collision happens (e.g., interferer shows up), a particular calibration data point may be given up.

The null may be difficult to obtain, for example if the received power has fallen below the noise level or the acknowledgement for a null transmission cannot be obtained. In that case according to embodiments of the invention, the peak relative phase may be reversed (e.g., minus 180 degrees) for the phase of the null of the two-antenna beam.

In addition, this calibration method may be applied to other TDD networks (for example a non WiFi network). Instead of SSID, the received system broadcast (for system message) channel power or pilot power may be used for UE receive beam calibration.

In a non-WiFi network, interferers may become an issue for the calibration. According to embodiments of the invention, a threshold of SINR may be set (e.g., 25 dB) for the receive beam peak. On the transmit beam peak, a reasonable data rate may be set as the threshold. Then according to embodiments of the invention the calibration may be calculated or determined to be valid only when there are data over these set thresholds.

According to one embodiment of the invention, the said calibration process may include measuring transmit and receive antenna patterns of the device; or finding out the weights (for example, the relative phase setting between two antennas or the relative amplitude setting or both) of the antenna pattern nulls or peaks. The calculation of weight setting difference may be based on nulls only.

According to one embodiment of the invention, the said antenna pattern measurements may be carried out with the direct radio frequency (RF) signal measurement or through system performance evaluation (for example, MCS—modulation coding set).

According to one embodiment of this invention, the said antenna pattern measurements (or calibration procedure) may be performed at the location that has line-of-sight view to another communication device in a communication system such as the WiFi access point (AP) (or base station). The location may also be close to the other communication device to minimize the interference and to mitigate the fading situation.

According to one embodiment of the invention, the line-of-sight view may be confirmed if the difference of received signal strength indicator (RSSI) from the receive antennas are within a pre-set range, such as threshold (for example, 3 dB), and if the fluctuation (due to fading) of RSSI from each of the receive antennas are within a pre-set threshold (for example, 3 dB).

According to one embodiment of the invention, the closeness of the calibrated device to an AP (or base station) may be confirmed if the received signal powers from each of the receive antennas are within a pre-set range (for example, −25 to −50 dBm in WiFi device calibration).

According to one embodiment of the invention, the receive antenna pattern may be obtained through for example a coherent combining process (for example, the maximum ratio combining) on the received signals from receive antennas, while varying the combining weight of the signals over a pre-set range (for example, varying the relative phase over a range of 0 to 360 degrees).

According to another embodiment, the weight setting for the null or peak of receive antenna pattern may be obtained by performing the channel estimation on the signal from each receive antenna.

A direct RF measurement for the transmit antenna pattern (transmit power vs. the relative phase between the transmit antennas) may not be feasible. According to one embodiment of the invention, the transmit antenna pattern may be represented by system performance parameter, for example, the measured data rate or feedback data rate or feedback channel information, instead of transmit RF power, versus the relative phase between the two antenna signals.

According to one embodiment of the invention, the communication device may transmit the same signal (same data from a large file) with equally amplitude (power) through the transmit antennas while changing the relative phase between the two signals (or antennas), and collects the system performance information (for example, MCS—modulation coding set) to represent the transmit antenna pattern.

According to one embodiment of the invention, for the said transmit antenna pattern measurement, the data rate (for example, MCS—Modulation and Coding Set fed back from base station, or the transmit data rate count when the fixed data rate transmission and re-transmission scheme is used) may be collected to represent the transmit antenna pattern.

The system parameters (for example, data rate) for a transmit null may not be reliably obtainable, due to the low signal-to-noise ratio at null. According to one embodiment of the invention, a computer processor may be configured to extrapolate from two reliable measured transmit data rates and their corresponding phase settings. For example the weight setting for the null may be extrapolated from the parameter slopes (for example, data rate changes) on the relatively reliable data on both sides of the null. The computer processor may be configured to calculate the offset of phase settings for transmit and receive antenna patterns by comparing the phase settings of the said transmit and receive nulls.

According to another embodiment, the weight setting for the null of an antenna pattern may be confirmed with the weight setting for the peak, which should occur at 180 degrees away from the null setting.

According to another embodiment of the invention, the antenna pattern calibration may be applied to the antenna pattern formed by any number of antennas.

Embodiments of the invention also provide a method comprising selecting a calibration site location for a station having plurality of antennas and radio circuit. The site location may have a line of sight view with another station in a communications network, such as an access point (AP). The method may then comprise monitoring a broadcast message from said another station (AP) and channel estimating on a receive signal from each radios/antennas representing a channel of the station. A phase difference $\Phi$ between the different channels may then be recorded and weights difference of the antennas calculated for the receive peak (RP) and receive null (RN) as $\Phi_{RP}=-\Phi$ and $\Phi_{RN}=\Phi_{RP}+180$ degrees, respectively.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be more fully understood by reference to the following detailed description when read with the accompanying drawings in which:

Figure 1:
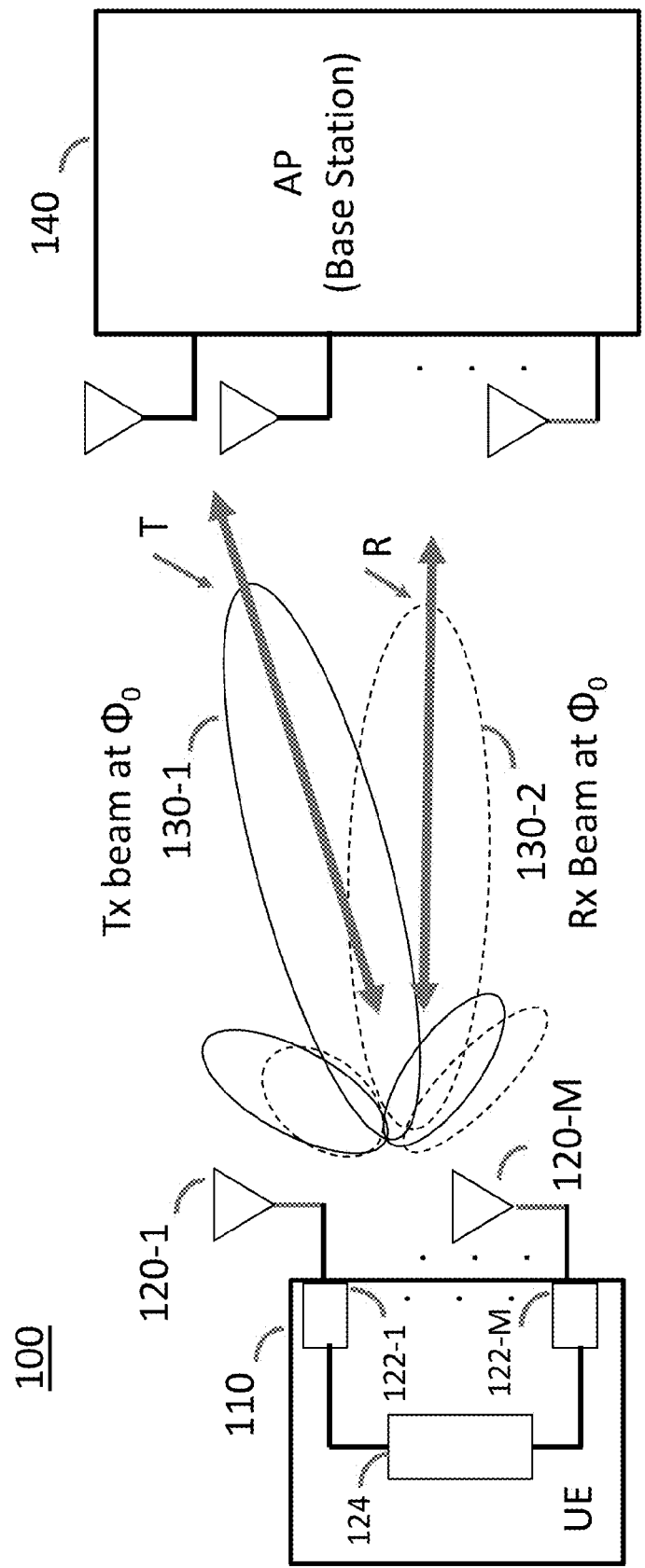
FIG. 1 shows that a station may have the unmatched transmit and receive antenna patterns when assigning the same weight (relative phase) for transmit antennas and receive antennas, according some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer processor or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In accordance with the present invention and as used herein, the following terms are defined with the following meanings, unless explicitly stated otherwise.

As defined above, in TDD a single channel (e.g., the same or overlapping frequency spectrum) is used for both downlink and uplink transmissions. For example, both stations and their served access point in WiFi systems use the same frequency channel alternatively in time to communicate each other. Alternatively TDD cellular communication, e.g., between a mobile device and a base station, may periodically alternate between uplink transmissions (e.g. from the mobile device to a base station for a predetermined uplink interval or period, such as, 5 milliseconds (ms)) and downlink transmissions (e.g. from a base station to a mobile device or UE for a predetermined downlink period, such as, 5 ms). The base station typically coordinates the alternating timing between uplink (UL) and downlink (DL) transmissions.

Embodiments of the present invention propose the calibration procedures to derive the correction factors (weight difference) on matching transmit and receive antenna patterns of a TDD device. This correction factor information may enable the device perform the beam-forming and/or nulling application for improving the spectral efficiency in TDD (e.g., WiFi) systems.

FIG. 1 is a block diagram showing a system 100 according to some embodiments of the present invention. System 100 shows a WiFi (i.e., TDD) system with the unmatched transmit (uplink) and receive (downlink) antenna patterns. Station 110 may have a baseband processor 124, M antennas 120-1 . . . , 120-M, and M radios, or radio circuits, 122-1 . . . , 122-M, each antenna may be used for both transmit and receive and any of the antennas 120-1 . . . , 120-M may be configured to operate together for both transmitting and receiving modes; Access Point (AP) 140 may also have multiple (M) antennas and radios. In transmit antenna pattern 130-1, T indicates the relative transmit gain with the relative phase of transmit antennas set at $\Phi_0$. In receive antenna pattern 130-2, R indicates the relative receive gain with the same relative phase ($\Phi_0$) set for the receive antennas. The transmit antenna pattern and the receive antenna pattern are not matched; with the same relative phase setting ($\Phi_0$), the transmit gain (T) is on the peak of the antenna patterns while the receive gain (R) is not.

Figure 2:
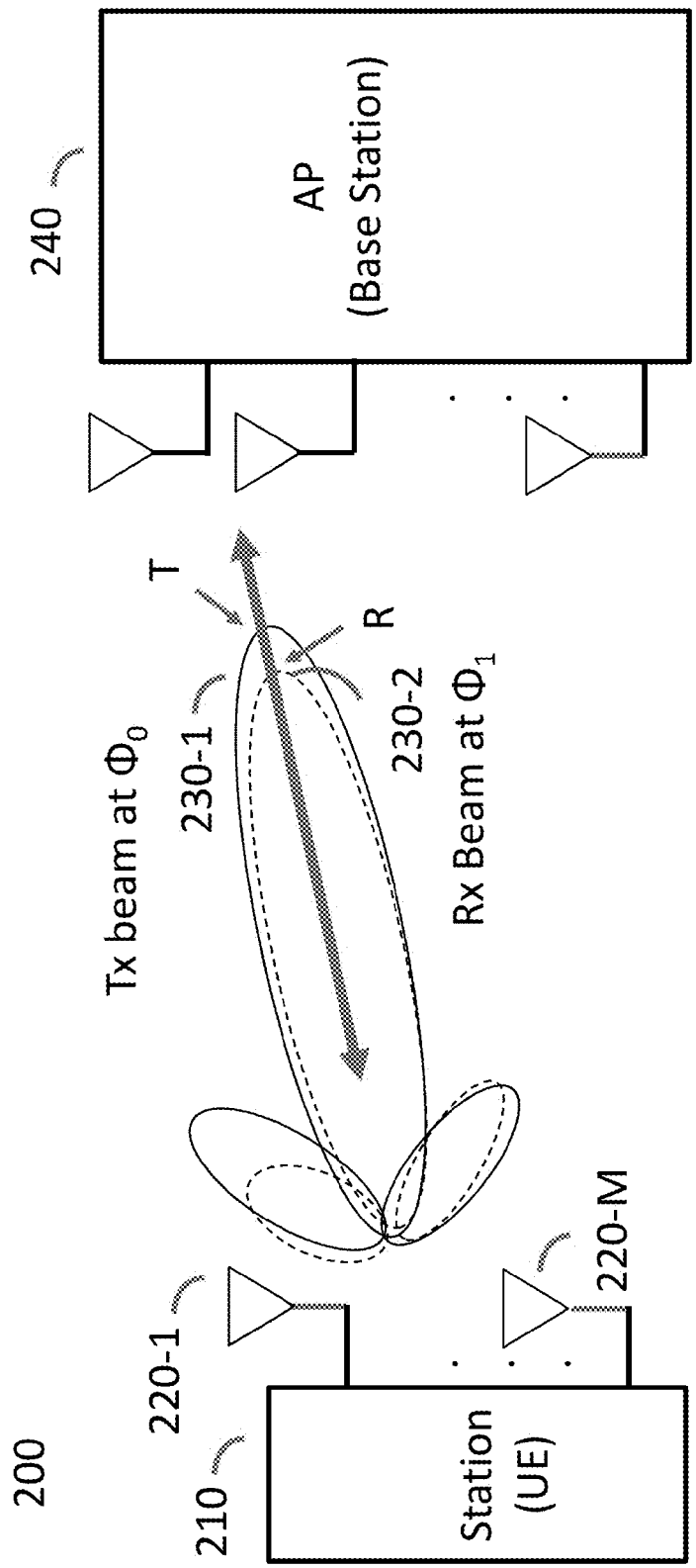
FIG. 2 shows that the station may have the matched transmit and receive antenna patterns with a different weight (relative phase) setting according some embodiments of the present invention.

FIG. 2 is a block diagram 200 illustrating the same system in 100 but with different relative phase settings for transmit antennas and receive antennas ($\Phi_0$ and $\Phi_1$, respectively) according some embodiments of the present invention. The receive antenna pattern 230-2, is then matched to the transmit antenna pattern 230-1, with these relative phase settings; both transmit and receive gains (T and R) are on the peaks of transmit and receive antenna patterns. The calibration is to find the difference between the relative phase settings ($\Phi_0$ and $\Phi_1$) so that the TDD device may perform beam-forming and nulling without the feedback from AP (or base station) and thus improve the spectral efficiency of the TDD system. Embodiments of the invention include the calibration procedures.

Figure 3:
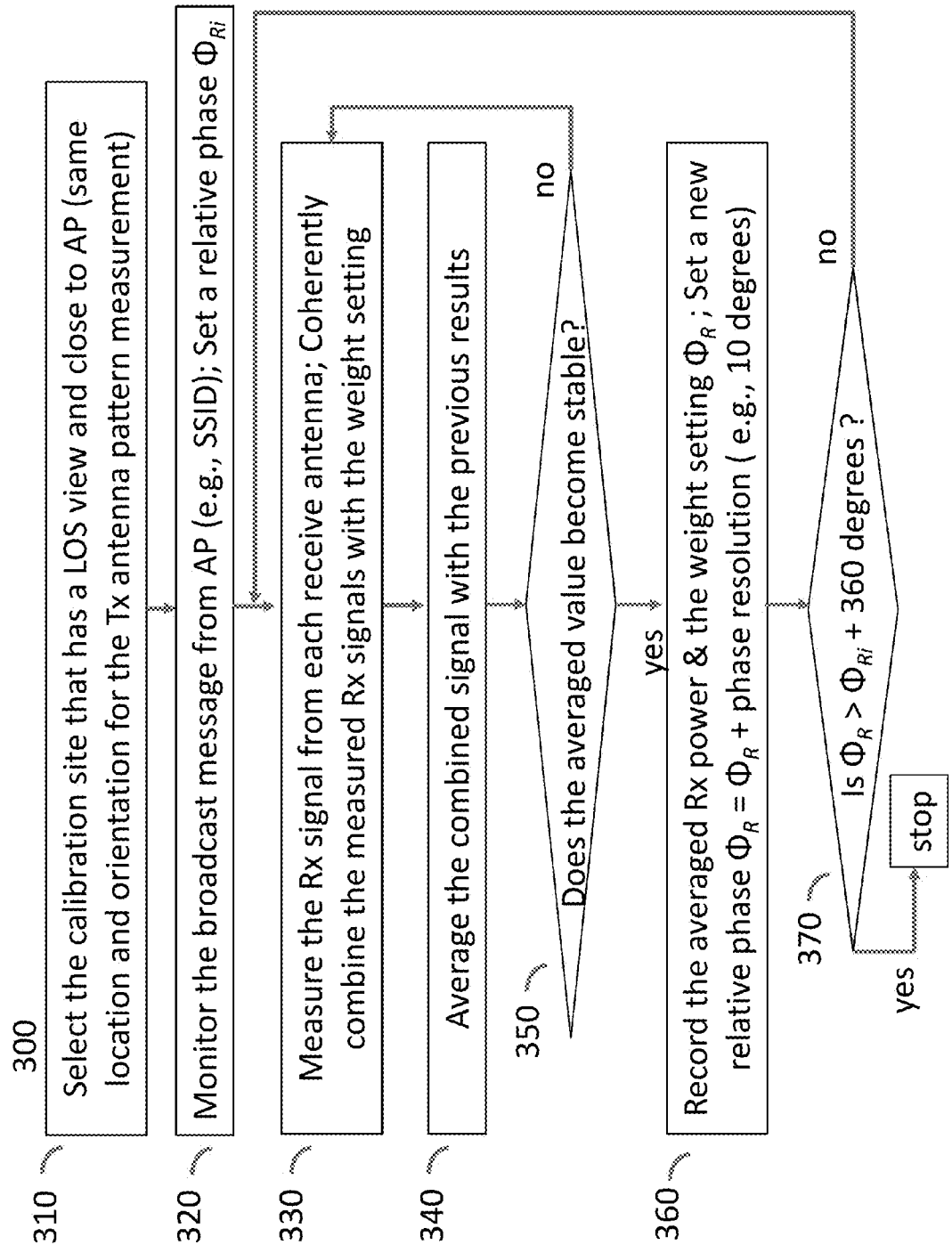
FIG. 3 depicts the procedures for measuring receive antenna patterns according some embodiments of the present invention.

Embodiments of the calibration procedures are configured to obtain the difference of weight (relative phase) settings between the transmit null (peak) and the receive null (peak). FIG. 3 is a flowchart 300 illustrating example procedures for measuring receive antenna patterns according some embodiments of the present invention. Step 310 shows that the calibration (e.g., receive and transmit antenna pattern measurements) may be performed at the location where the device is, which preferably has a Line-Of-Sight (LOS) view to the AP (or base station) and close to the AP to minimize the impact of the multiple paths, interference, and fading. The line-of-sight view may be defined quantitatively. For example, LOS may be confirmed if the difference of received signal strength indicator (RSSI) from the receive antennas are within a pre-set threshold (for example, 3 dB) and if the fluctuation (due to fading) of received signal strength indicator (RSSI) from each of the receive antennas are within a pre-set threshold (for example, 3 dB). The closeness of the calibrated device to AP (or base station) may be defined quantitatively as well. For the example of the WiFi device calibration, the closeness may be confirmed if the received signal powers from each of the receive antennas are within a pre-set range (for example, −25 to −50 dBm).

For receive antenna pattern measurement, Step 320 shows that the device may monitor the constant signal broadcasted from AP (or base station), for example, the Service Set identifier (SSID) from WiFi AP or system broadcast message (including pilot) from base station. An initial relative phase $\Phi_{Ri}$ may be set in Step 320 as well. Step 330 shows that the device under calibration may measure the received signals from each receive antenna and coherently combine them with the weight (relative phase) setting. For example, the combined signal power $C(\Phi_R)=a^2+b^2+2*a*b*\cos(\Phi_R)$, where a and b are the received signal strength (amplitude) from each of the two antenna and $\Phi_R$ is the relative phase setting (may be $\Phi_{Ri}$ for the initial measurement). Step 340 shows that the combined signal powers may then be averaged over many repeated measurements until the average value becomes stable (for example, the average values fluctuates within a pre-set value say, 1 dB or 20%). The collected signal strength may be discarded and not be input into the averaging if the discrepancy of signal strengths (a and b) exceed a pre-set threshold (for example 1 dB). Step 350 indicates that the received signal measurement and the signal combining using the same relative phase will be repeated if the averaged value is not relative stable. Once the stable averaged combined power becomes stable, 360 shows that the averaged combined power and the corresponding relative phase setting may be stored and a new relative phase may be set by adding the phase resolution (say, 10 degrees) to the current relative phase setting. Step 370 shows that the receive antenna patterns measurement is complete and may be stopped once the measurements have through the full range (360 degrees) of the relative phase settings. Otherwise, continue the measurement with the new phase setting.

Figure 4:
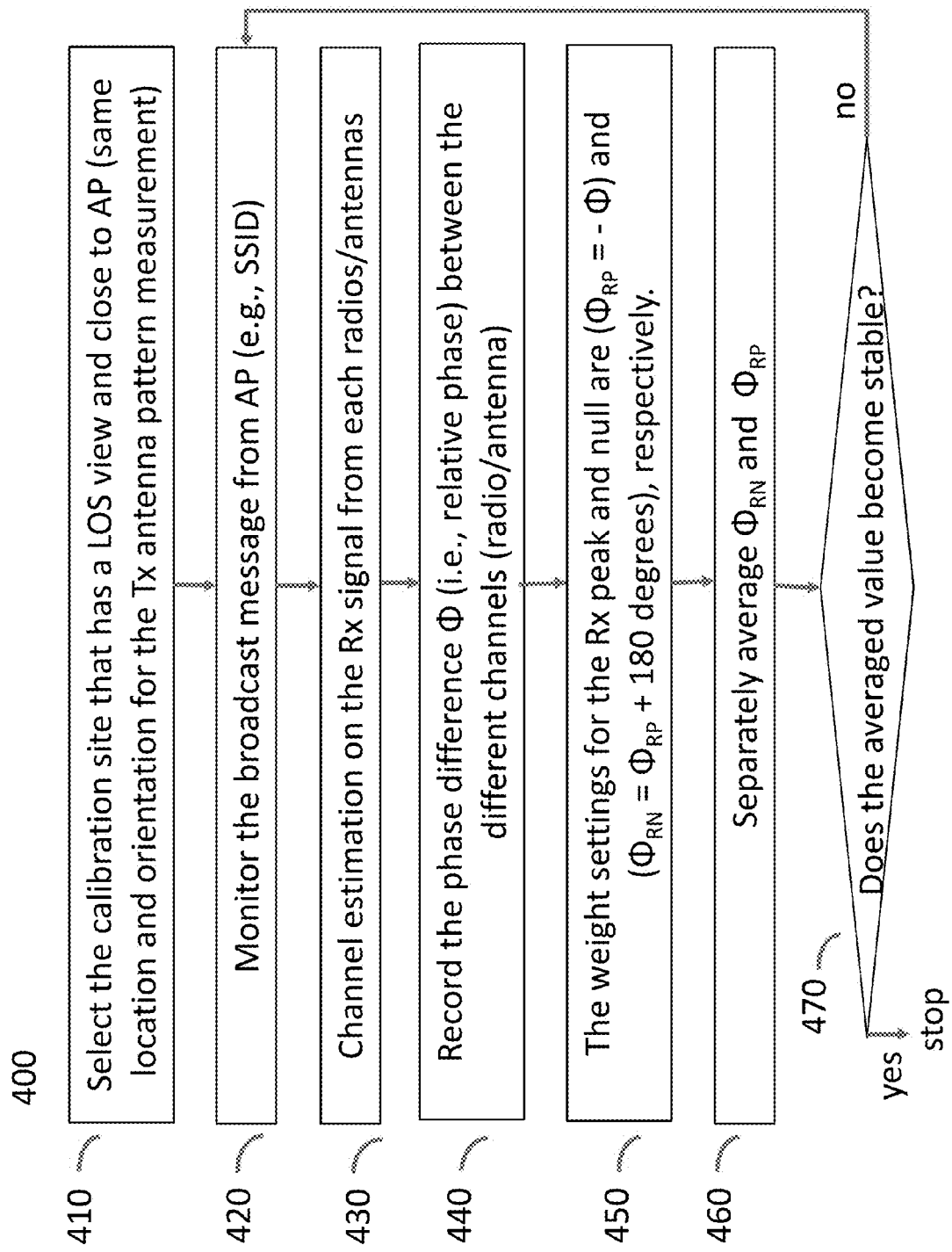
FIG. 4 depicts the procedures for weight setting measurements for the receive antenna peak and null using a channel estimation method according some embodiments of the present invention.

The calibration is to find the weight (relative phase) between transmit and receive antenna patterns. On certain antenna spacing (for example, distance of the antennas is less than half of the wavelength), the antenna patterns may have a single null (or peak). The antenna pattern offset may be obtained by comparing the relative phase settings of transmit null (or peak) and receive null (or peak). The calibration may then only measure the phase setting for the null (or peak), instead of the measurement for the whole antenna pattern. FIG. 4 is a flowchart 400 illustrating that the calibrated device may perform channel estimation to obtain the relative phase setting for the receive null and peak according some embodiments of the present invention. Thus the baseband processor may deduce the antenna pattern by applying channel estimation on the received signal from each antenna. Step 410 selects the calibration site that has a LOS view and close to AP (same location and orientation for the Tx antenna pattern measurement). The calibration device monitors the constant broadcast message that has a pilot (or reference signal), shown in Step 420. Step 430 shows that the calibrated device may perform a channel estimation on the pilot or reference signal. Step 440 indicates that the relative phase Φ between the two (receive antennas) channels may be found and stored. The phase settings for the receive peak, $\Phi_{RP}$, and null, $\Phi_{RN}$, may then be found as:

$$\Phi_{RP} = -\Phi \quad (1)$$

$$\Phi_{RN} = \Phi_{RP} + 180 \text{(degrees)} \quad (2)$$

In other words the receive null is deduced by adding 180 degrees to the phase setting of the receive peak.

Step 460 shows that the phase settings may be separately averaged over several channel estimations. Step 470 indicates that the receive null (peak) measurement is complete and may be stopped once the averaged values become stable. Stability can be achieved when, for example, the fluctuation of the averaged values is less than a pre-set value (say, 20%).

A direct RF signal measurement may not be feasible for the transmit antenna pattern. Instead, the system performance, for example, data rate evaluation, may be used for representing the transmit antenna pattern. A transmit antenna pattern may be presented by collected data rates versus the relative phase settings of the transmit antennas. For the transmit antenna pattern measurement, the calibrated device may transmit the equal and constant amplitude signal through the transmit antennas and collect the data rate information for various relative phase settings (between the transmit antennas).

Figure 5:
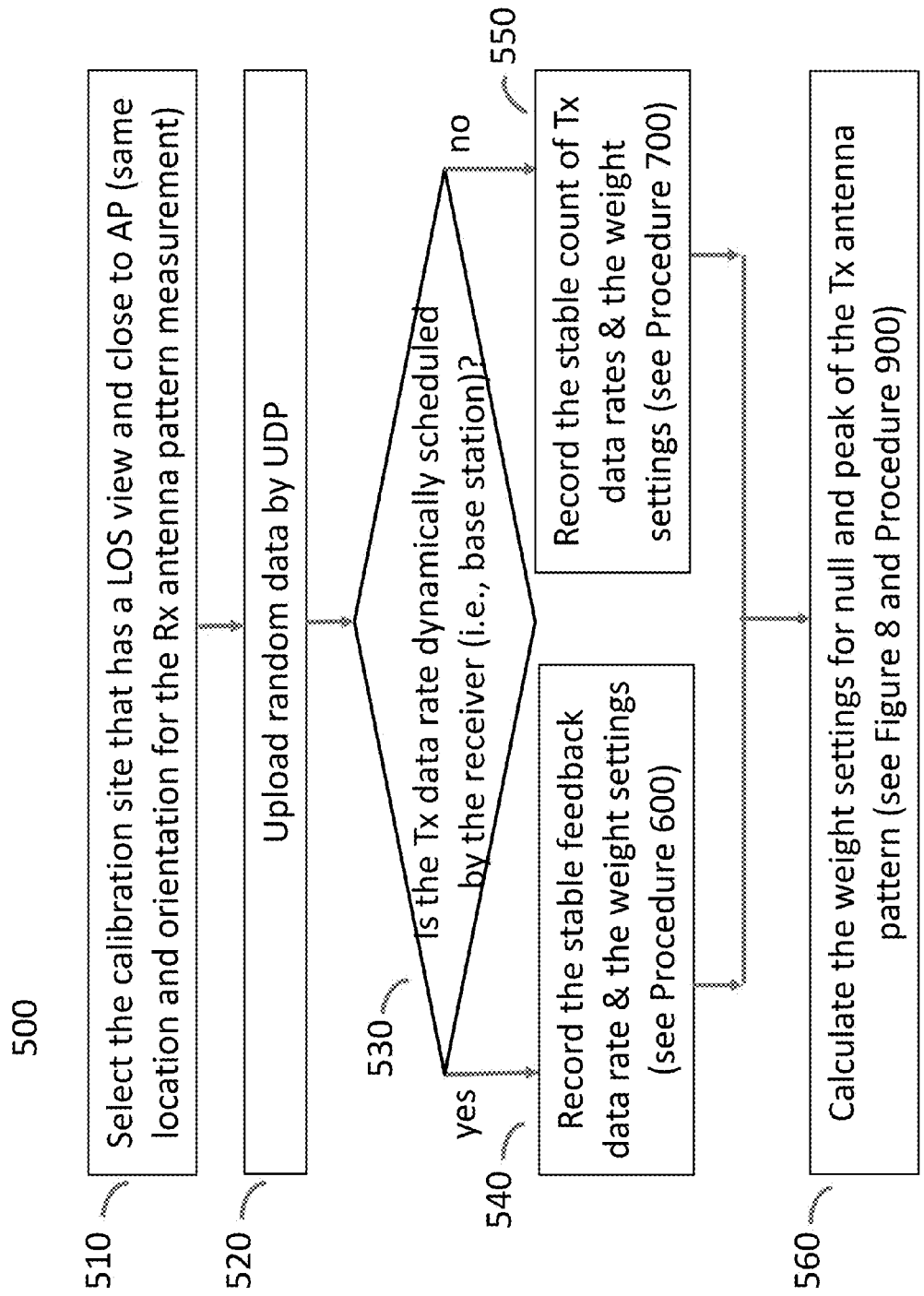
FIG. 5 depicts the procedures for weight setting measurements for the transmit antenna peak and null according some embodiments of the present invention.

FIG. 5 is a flowchart 500 depicting an example procedure to measure the transmit antenna pattern according some embodiments of the present invention. Step 510 indicates that transmit antenna measurement should be done at the same site and the same orientation for receive antenna pattern measurement. Step 520 shows that the calibrated device may perform User Datagram Protocol (UDP) to upload random data until transmit antenna measurement is completed. The data rate count may be based on the feedback data rate information or counted by the calibrated device itself, depending on the system data transmission scheme. Step 530 shows that if the transmit data rate is dynamically scheduled (based on the channel quality) by the receiver (e.g., base station), for example, in TDD-LTE system, the feedback data rate (MCS—Modulation/Coding Set) may then be used for representing the antenna pattern, shown on step 540.

Figure 6:
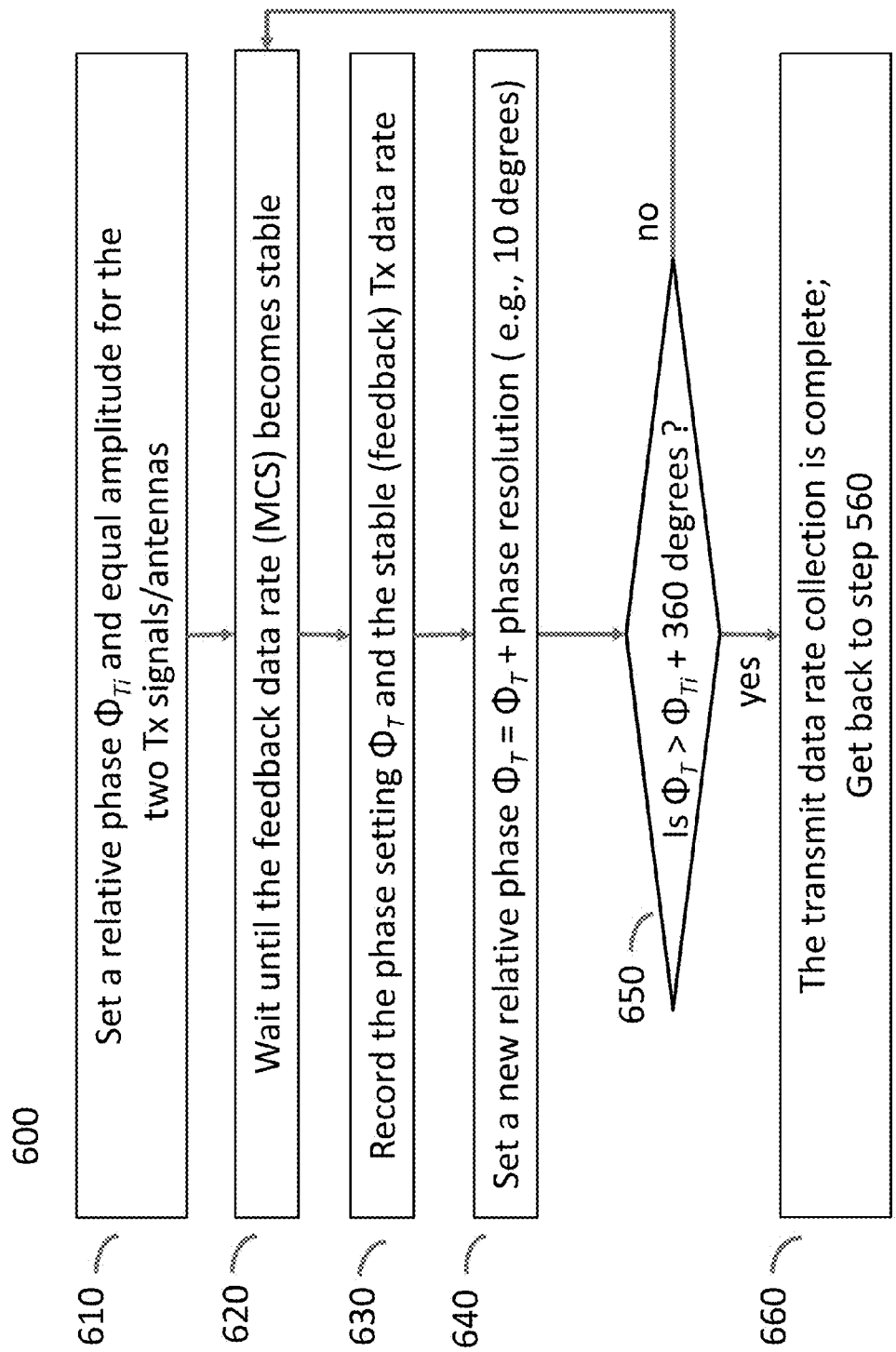
FIG. 6 depicts the procedure of measuring the weight setting and the Tx data rate for the system with dynamically pre-scheduled transmission according some embodiments of the present invention.

An embodiment of a procedure for the data rate collection based on feedback is shown in FIG. 6 in flowchart 600 according some embodiments of the present invention. As opposed to LTE, for example, in a WiFi system, the transmit data rate is not scheduled by the receiver station, the calibrated device may then count the transmit data rate itself 550.

Figure 7:
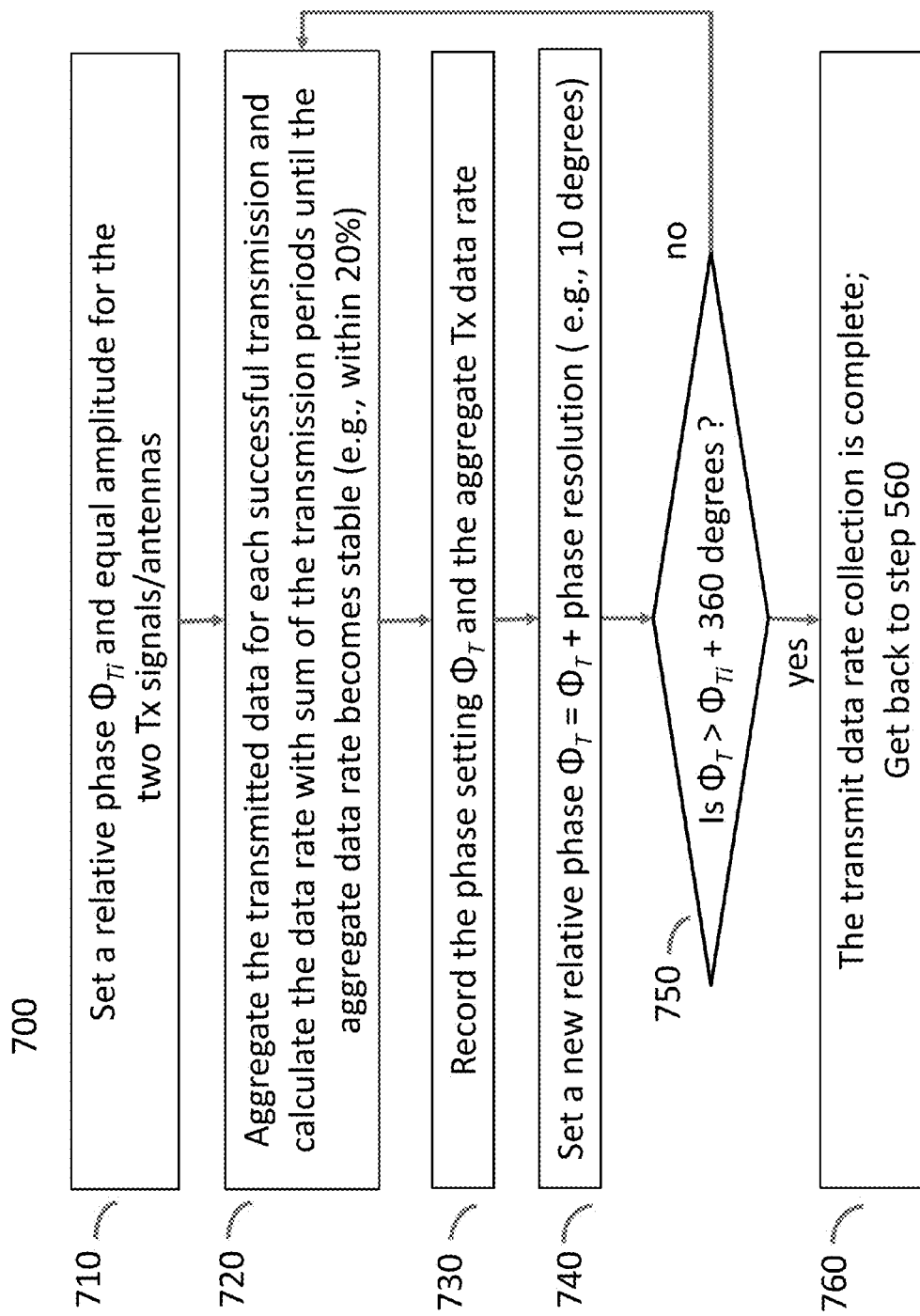
FIG. 7 depicts the procedure of measuring the weight setting and the Tx data rate for the system with non-scheduled transmission according some embodiments of the present invention.

FIG. 7 is a flowchart 700 showing an embodiment of a procedure for self-counting on the transmit data rate. The data rate count may be limited by the system setup and/or the receiver capability. For example, the received signal (and SNR) may be too low to support any transmit data rate, due to that the transmission is on or around the transmit null. On the other hand, the received signal (and SNR) may far exceed the required SNR to support highest transmit data rate of the system setup when the transmission is on or around the transmission peak. 560 calculate the phase settings for transmit null and peak. Example detailed calculation and procedure are described in FIGS. 8 and 9.

For a system with dynamically scheduled transmit data rate by receiver, the feedback data rate information may be collected for representing the transmit antenna pattern. Flowchart 600 of FIG. 6 depicts an example procedure to collect the transmit data rate. Here the same signal with equal amplitude is transmitted through the transmit antennas, for example under the control of a baseband processor, while varying the relative phase between the two signals, and collects the data rate information for the said transmit antenna pattern measurement. Feedback information may be used to determine data rates for performing transmit antenna pattern measurement. Step 610 shows that the calibrated device set a relative phase $\Phi_{Ti}$ and equal amplitude for the two transmit signals/antennas for the UDP transmission. Step 620 indicates that the calibrated device monitor (and use) the feedback MCS until it becomes stable, For example, the feedback MCS is not changed for consecutive pre-set number (say, 10) of feedbacks. The relative phase setting and the feedback data rate (MCS) may then be stored, shown on 630. Step 640 shows that a new phase setting by adding the pre-set phase resolution (say 10 degree) may be set for continuous UDP transmission. Step 650 shows that if data rate collection has through the whole range of the phase settings (360 degrees), the calibrated device may stop the data rate collection and proceed to calculate the phase setting for transmit null and peak shown on 660. Otherwise, it continues the data rate collection with the new phase setting.

For a system with non-scheduled transmit data rate by receiver, the calibrated device may count its transmit data rate for representing the transmit antenna pattern. Flowchart 700 of FIG. 7 depicts an example procedure to self-count the transmit data rate. Step 710 shows that the calibrated device set a relative phase $\Phi_{Ti}$ and equal amplitude for the two transmit signals/antennas for the UDP transmission. In the example of WiFi system, the transmission may be with irregular data size and on the irregular time period, and may be even unsuccessful. Step 720 indicates that the calibrated device may sum the transmitted data for each successful transmission and calculate the data rate with the sum of the transmission periods until the aggregate data rate becomes stable. The relative phase setting and the stable aggregate data rate may then be stored, shown on 730. Step 740 shows that a new phase setting by adding the pre-set phase resolution (say 10 degree) may be set. Step 750 shows that if data rate collection has through the whole range of the phase settings (360 degrees), the calibrated device may stop the data rate collection and proceed to calculate the phase setting for transmit null and peak shown on 760. Otherwise, it continues the data rate collection with the new phase setting.

Figure 8:
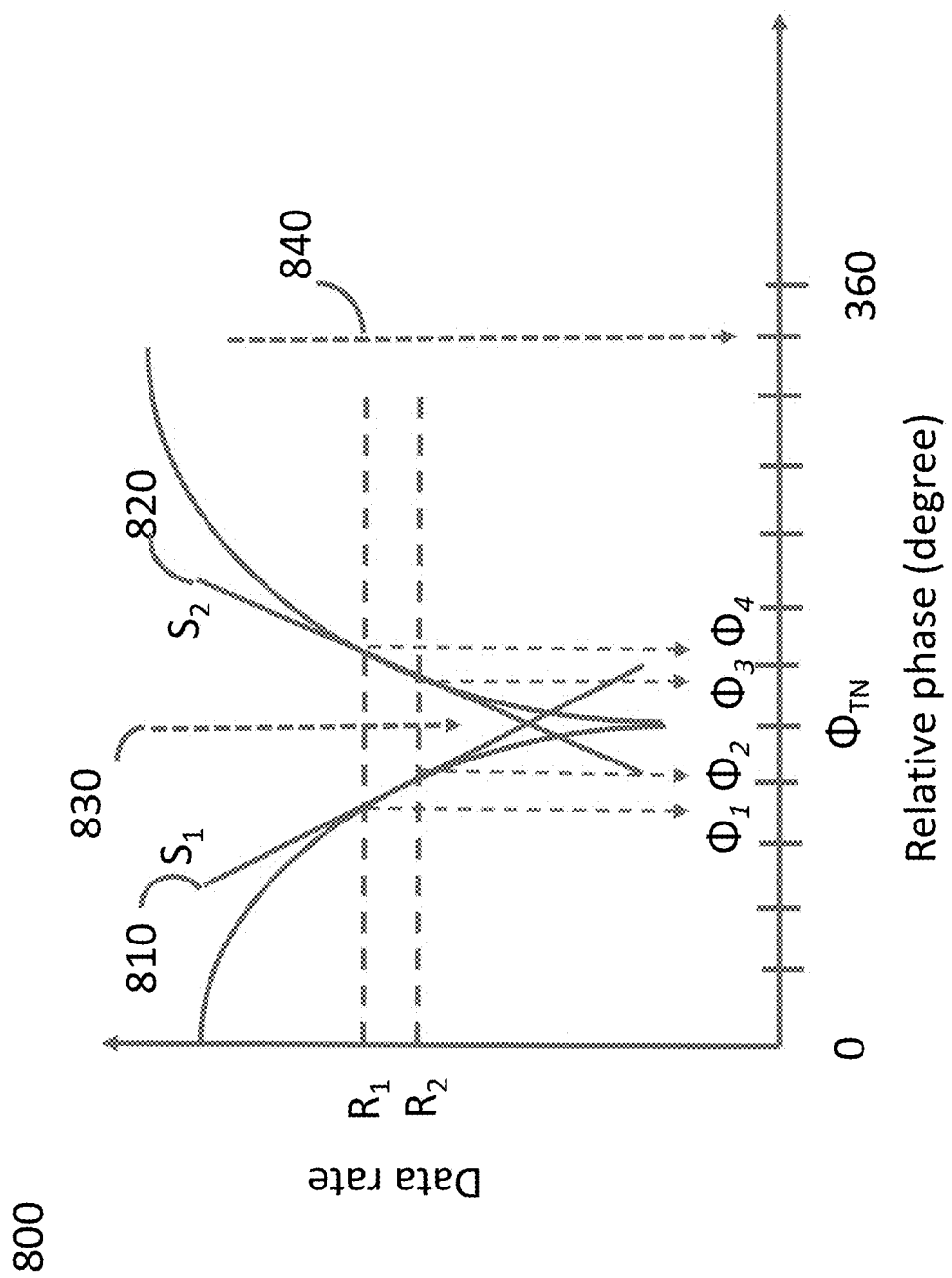
FIG. 8 illustrates the exemplary measured data from which the phase setting for the transmit null may be extrapolated according some embodiments of the present invention.

FIG. 8 is a graph diagram 800 showing the example of the collected data rate and relative phase settings for obtaining the phase setting of the transmit null and peak according some embodiments of the present invention. In the example, $R_1$ and $R_2$ are the measured data rates in the midrange of the all measured data rates selected for calculate the phase setting for the transmit null. The reasons for selecting the data rates in the midrange are that the data rate measured around the transmit null may be too noisy (and unreliable) and the data rate measured around the transmit peak may be under-stated due to the system limitation and hence not accurate. Each measured data rate may have two phase settings; phase settings of $\Phi_1$ and $\Phi_4$ result in the measured data rate $R_1$ and $\Phi_2$ and $\Phi_3$ for $R_2$, shown in 800. These phase settings ($\Phi_1$, $\Phi_2$, $\Phi_3$, and $\Phi_4$) and the selected data rate (R1 and R2) may form two straight lines $S_1$ (810) and $S_2$ (820). $S_1$ and $S_2$ may then be presented as $$S1: R = [(R_1 - R_2)/(\Phi_1 - \Phi_2)] * \Phi + (R_2 * \Phi_1 - R_1 * \Phi_2)/(\Phi_1 - \Phi_2) \quad (3)$$

$$S2: R = [(R_1 - R_2)/(\Phi_4 - \Phi_3)] * \Phi + (R_2 * \Phi_4 - R_1 * \Phi_3)/(\Phi_4 - \Phi_3) \quad (4)$$

The phase setting of transmit null, $\Phi_{TN}$, is the phase setting corresponding to the intersect point (830) of the two lines. Using Equation 3 and 4, the phase setting of transmit null may be obtained, $$\Phi_{TN}=(\Phi_1*\Phi_3-\Phi_2*\Phi_4)/(\Phi_1-\Phi_2+\Phi_3-\Phi_4) \quad (5)$$

840 shows the phase setting for the transmit peak, which is 180 degree away from the transmit null.

Figure 9:
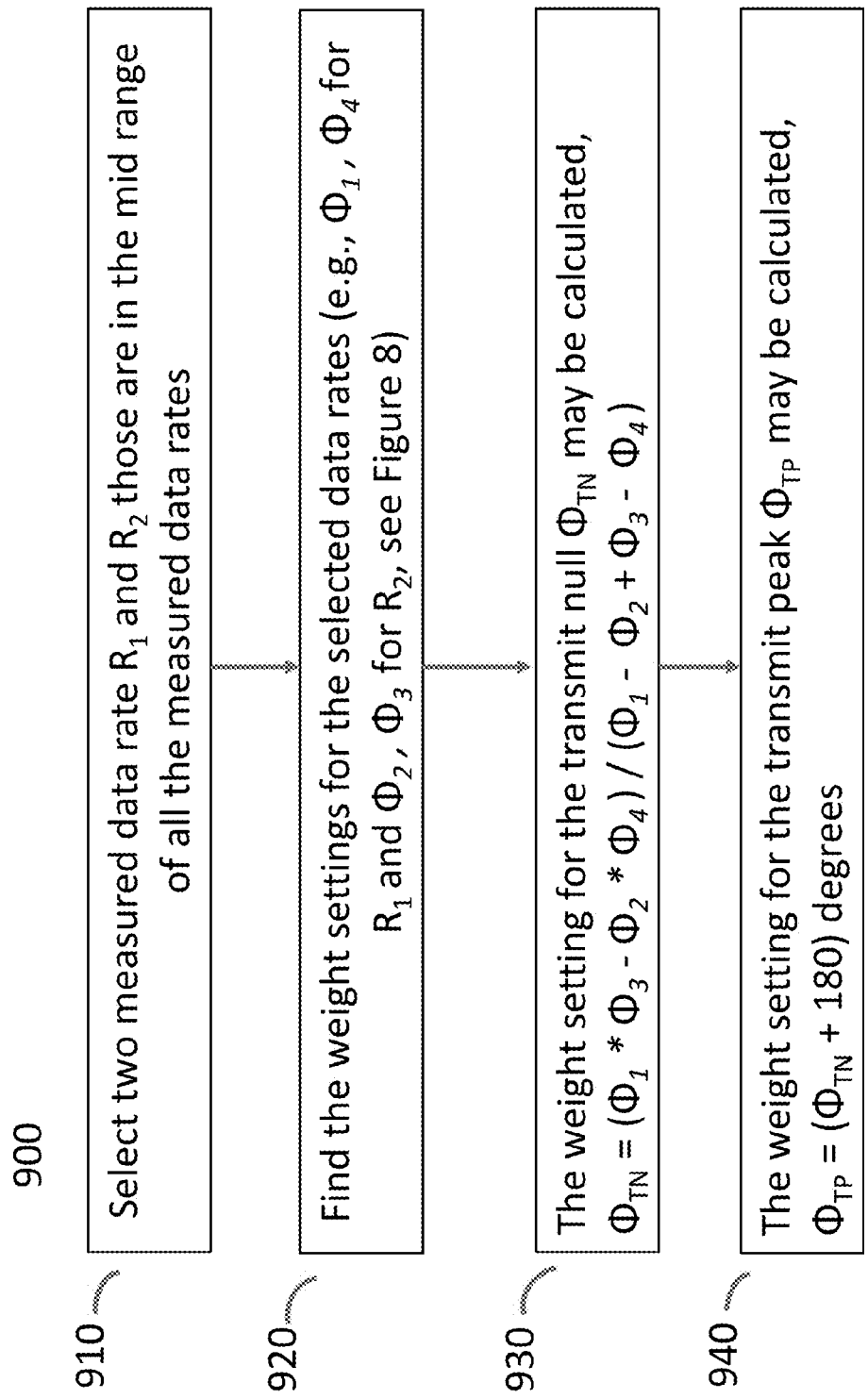
FIG. 9 depicts the procedure for calculating the phase settings for the transmit null and peak using the reliably measured data rates (versus relative phases) according some embodiments of the present invention.

FIG. 9 is a flowchart 900 depicting an example procedure calculate the phase settings of the transmit null and peak according to some embodiments of the present invention. Step 910 shows that two data rates $R_1$ and $R_2$ in the midrange of all the measured data rates may be selected to calculate the phase setting of transmit null. Step 920 is the procedure to find the phase settings for the two selected data rate ($\Phi_1$, $\Phi_4$, $\Phi_2$, and $\Phi_3$). Step 930 shows that the phase setting of transmit null, $\Phi_{TN}$, may be calculated according Equation 5. In step 940 the phase setting for the transmit peak $\Phi_{TP}$ may be calculated, $$\Phi_{TP}=(\Phi_{TN}+180) \text{degrees} \quad (6)$$

The phase offset of transmit and receive antenna pattern may be obtained by comparing the phase settings for transmit and receive nulls, $\Phi_{TN}$ and $\Phi_{RN}$.

Figure 10:
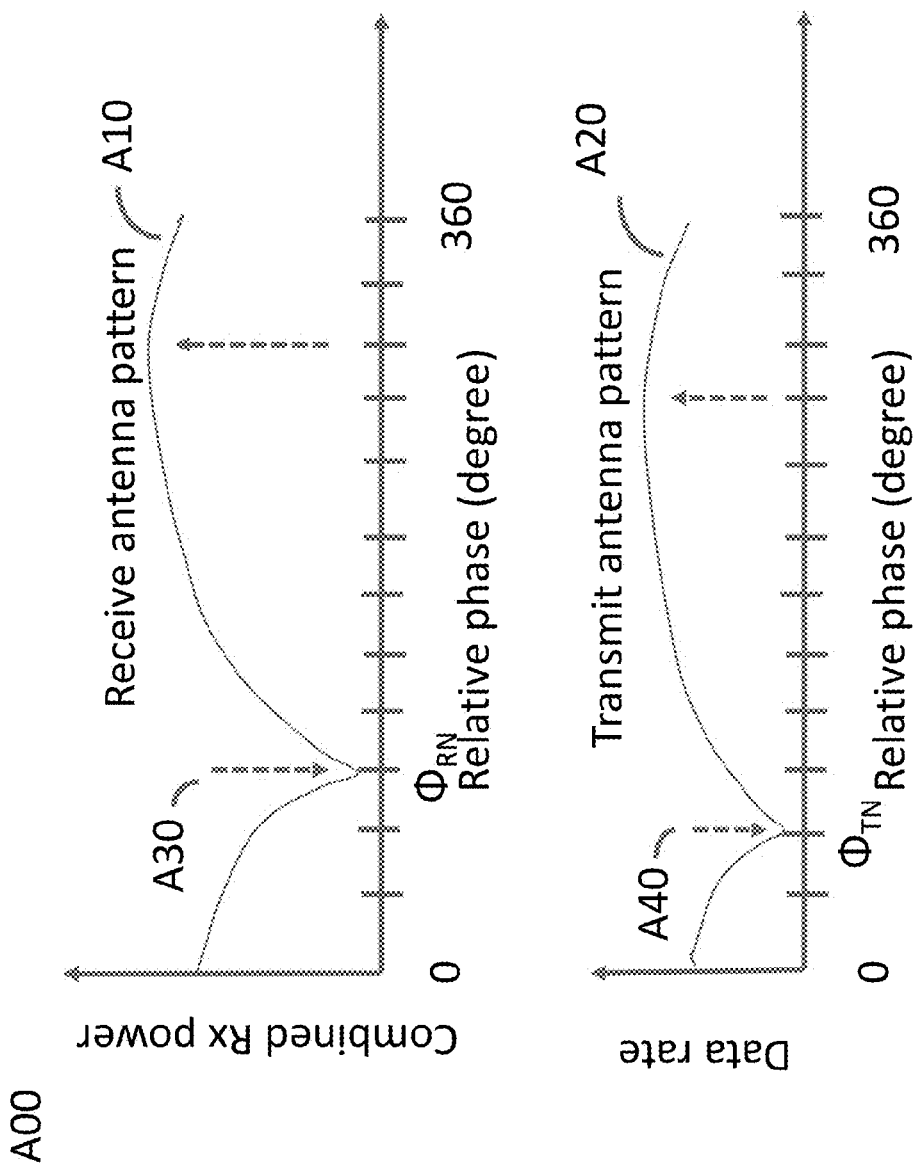
FIG. 10 shows the exemplary collected data from which the calibration results may be obtained by comparing the phase settings of receive null and transmit null (e.g., $\Phi_{RN}$ and $\Phi_{TN}$) according some embodiments of the present invention.

FIG. 10 shows exemplary collected data A00 for transmit and receive antenna patterns formed by two antennas according to some embodiments of the present invention. In this exemplary figure, A10 and A20 indicate receive and the transmit antenna patterns. From the phase settings of receive null (A30) and transmit null (A40), the calibration procedure according to embodiments of the present invention finds 30 degree phase shift between these two antenna patterns (A10 and A20).

The foregoing describes the adjustment of relative phase between multiple transmitters, or between multiple receivers, to compensate for differences between transmit and receive paths. The matching of transmit and receive antenna patterns to achieve equivalent peaks and nulls can be further improved, especially the matching of nulls, by additionally adjusting the relative amplitudes of signals. The following describes the adjustment of amplitude with reference to FIGS. 11 to 14. Embodiments of the invention may be used to calculate or determine a relative amplitude setting for the transmit antenna pattern and a relative amplitude setting for the receive antenna pattern, or both. The difference between these two relative amplitude settings may be determined as a weight setting difference between transmit and receive antenna patterns. As with the phase setting difference described above, the amplitude setting difference may be determined based on nulls in the antenna patterns. The determination of amplitude setting is particularly useful for signal cancellation.

Figure 11:
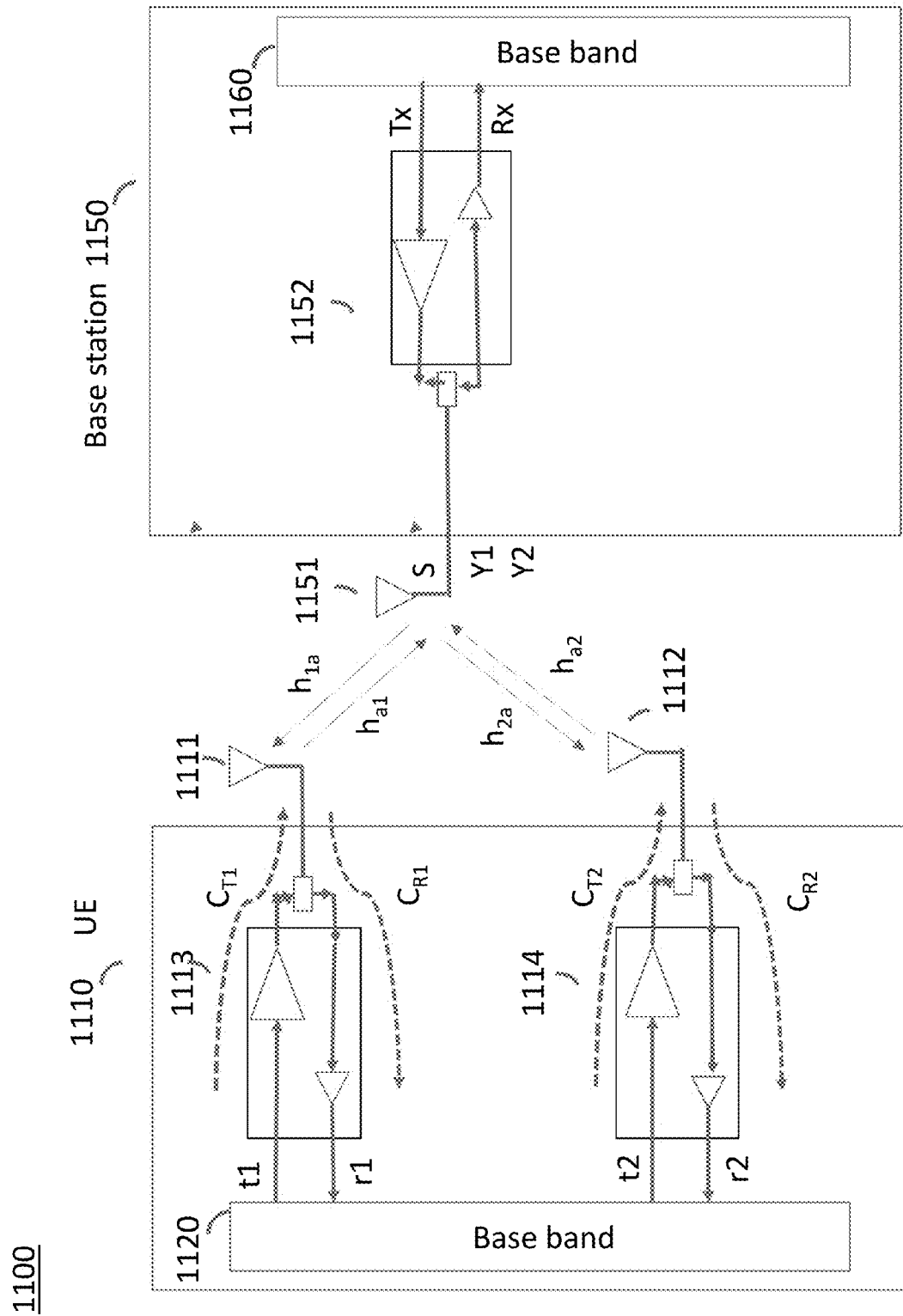
FIG. 11 is a schematic illustration of a channel description and basic components of a TDD MIMO system according to some embodiments of the present invention.

FIG. 11 illustrates an example TDD MIMO system. Embodiments of the invention may be implemented in any station in a communications network. FIG. 11 illustrates embodiments of the invention using a UE and a base station or access point by way of example. The roles of the UE and the base station may be reversed and each may be substituted for another station. The system shown in FIG. 11 includes UE 1110 comprising, in this example, two antennas 1111 and 1112 and respective radios, or radio circuits, 1113 and 1114. The principles of embodiments of the invention may be extended to any number M of antennas and radios. Any of the antennas may be configured to operate together for both transmitting and receiving modes. The system also comprises base station 1150 which may also have M antennas and radios, only one of which is shown in FIG. 11, antenna 1151 and radio 1152. Each antenna on these two devices, UE 1110 and base station 1150 may be used for both transmit and receive, but not simultaneously, in the TDD MIMO operation. The channels available over the air (between the antennas) are reversible. Each radio 1113, 1114 and 1152 comprises respective amplifiers for the transmit and receive paths. UE 1110 comprises a baseband processor 1120 and base station 1150 comprises a baseband processor 1160.

The received signals at antennas 1111 and 1112 in receive mode respectively can be represented as:

$$r1=C_{R1}*h_{1a}*S \; r2=C_{R2}*h_{2a}*S \quad (7)$$

where:
S is the transmitted signal
C represents the gain or loss caused by components inside the transmitter/receiver
h represents the effect of the over-the-air channel.

A single antenna base station 1150 will receive two signals from antennas 1 and 2 in transmit mode, indicated as Y1 and Y2 in FIG. 11, which can be represented as:

$$Y1=h_{a1}*C_{T1}t1 \text{ and } Y2=h_{a2}*C_{T2}*t2 \quad (8)$$

It can be assumed that $$h_{1a}=h_{a1} \text{ and } h_{2a}=h_{a2} \quad (9)$$

since these are reciprocal over the air channels.

In order to achieve a transmit null from antennas 1 and 2 to antenna A, the signals Y1 and Y2 should cancel each other out. In other words the goal is to achieve, as near as possible:

$$Y1/Y2=-1 \text{ or } Y_1=Y_2*e^{j\,180} \quad (10)$$

From equations 7 and 8 we can derive:

$$r_1*t_1=S*Y_1*C_{r1}/C_{t1} \text{ and } r2*t2=S*Y2*C\,r2/C\,t2 \quad (11)$$

and $$(r2*t2)/(r1*t1)=(Y2/Y1)*(C_{r2}*C_{t1})/(c_{r1}*C_{t2}) \quad (12)$$

We now define:

$$R_{12}=r1/r2, \; T_{12}=t1/t2, \; C_{12}=(C_{r2}*C_{t1})/(C_{r1}*C_{t2}) \quad (13)$$

and $$C_{12}=(C_{T1}*C_{R2})/(C_{T2}*C_{R1})=A_{12}e^{j\Phi 12} \quad (14)$$

where $A_{12}$ and $\Phi 12$ are the unknown amplitude and phase corrections for channel reciprocity.

After the signals from two antennas have been adjusted to be out of phase, cancellation of the respective signals can be further improved by amplitude matching. Now suppose that for receive nulling, $r_1$ and $r_2$ have been set 180° apart via a received signal phase adjustment of θ12, and amplitude correction B12, then $C_{12}=1/(R_{12}*T_{12})$ becomes: $C_{12}^{Rx\,null}=(r2*t2)(B12*r1*e^{j\theta 12}*t1) \quad (15)$ It is then useful to calculate or determine what adjustment of phase and amplitude is needed between transmit and receive modes in order to achieve phase nulling in transmit mode. The goal is to achieve $Y_1=Y_2*e^{j\,180}$, which is to adjust the transmit phase between $t_1$ and $t_2$ by $\Phi 12$ starting from receive nulling correction θ12, and the amplitude ratio by A12 from receive amplitude correction B12, so starting from equation (15)

$$C_{12}^{Rx\,null+Tx\,null}=(r2*t2)/(B12*A12*r1*e^{j(\theta 12+\Phi 12)}*t1) \quad (16)$$

A possible method of calculating or determining the amplitude ratio according to embodiments of the invention will now be described with reference to FIG. 12. Some or all of the operations of FIG. 12 may be performed in the baseband processor, e.g. baseband processor 1120, for example by suitable programming of the baseband processor. At operation 1210 the relative phase settings for the receive and transmit nulls are determined. This may be done using any of the methods described above with reference to FIGS. 1 to 10. From this procedure it is possible to determine the relative phase between transmit and receive as:

$$\Phi 12 = \Phi_{TN} - \Phi_{RN} \quad (17)$$

$\Phi_{TN}$ and $\Phi_{RN}$ are the relative phase settings for transmit null and receive null determined by any of the procedures described above with reference to FIGS. 1 to 10 and $\Phi 12$ is the phase correction for channel reciprocity, also termed "calibrated phase" or phase setting difference. The phase setting difference is an example of a weight setting difference that may be determined as described with reference to FIGS. 1 to 10. It will be appreciated that this phase adjustment or calibrated phase is intended to be applied on switching from reception to transmission (and a reverse adjustment is applied on switching back) to achieve, in the illustrated example of FIG. 11, a null at the base station, or at least to minimize the amplitude of the combination of signals received by or transmitted to the two antennas 1111 and 1112.

It is then possible to adjust the amplitude for both receive and transmit imbalances in order to achieve deep up and down (transmission and reception) nulls. According to embodiments of the invention this adjustment of amplitude is applied in addition to the phase adjustment to further improve the nulling effect of combining two signals. As with phase, it is possible to calculate or determine a correction of relative amplitude or calibrated relative amplitude, to be applied on switching from reception to transmission, or in reverse from transmission to reception.

Figure 12:
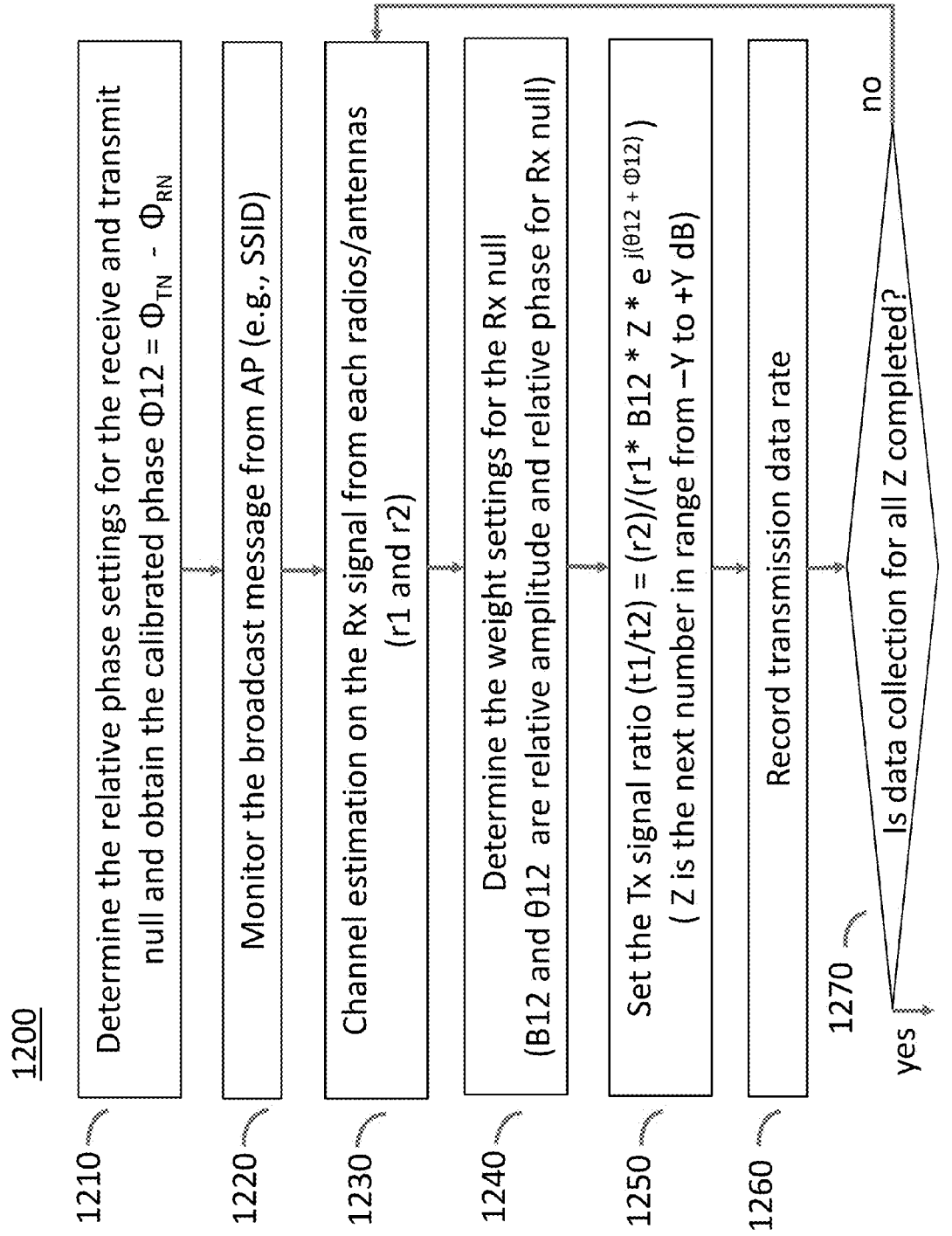
FIG. 12 is a flow chart showing a method of calculating or determining relationship between amplitude ratio and received signal according to some embodiments of the present invention.

In the subsequent operations of FIG. 12, according to embodiments of the invention, the phase between transmission and reception is adjusted in order to match the transmit and receive antenna patterns, for example using the predetermined phase difference $\Phi 12$. According to embodiments of the invention, the process of calculating or determining the phase and amplitude corrections may be repeated at intervals.

At operation 1220, a broadcast message from the base station or AP is monitored, for example this may be the SSID. At operation 1230, channel estimation is performed on the received signal from each of the antennas, r1 and r2.

Next at operation 1240, new weight settings B12 and $\theta 12$ (amplitude and phase, see equation 15) are determined for the receive null based on the channel estimation. These weight settings are for relative phase and amplitude between the two antennas 1111 and 1112 in receive mode. It should be noted here that both $\Phi_{RN}$ and $\theta 12$ represent the relative phase between antennas to achieve a receive null. $\phi_{RN}$ is derived from a process of averaging described with reference to FIG. 4 whereas $\theta 12$ may be based on one channel estimation.

Next, at operation 1250, with the relative phase of signals t1 and t2 set to achieve a null by applying the phase calibration $\Phi 12$ determined at operation 1210, an amplitude ratio between signals t1 and t2 is set and data is uploaded.

In order to determine a suitable amplitude ratio t1/t2 to be used, the channel estimation in operation 1230 may be performed before each collection of "transmit" data to obtain values of r1 and r2. The transmit signal ratio may be determined as:

$$(t1/t2) = (r2)/(r1*B12*Z*e^{j(\theta 12 + \Phi 12)}) \quad (18)$$

Z is a real number representing the difference in amplitude ratio between transmit and receive antenna patterns and may be varied within a predetermined range in iterations of operation 1250, for example −Y to +Y in dB. Operation 1250 may be performed with different values for t1/t2 at intervals, for example of one second.

The transmission date rate for each value of t1/t2 may be determined, for example based on feedback information received from the base station 1150. The relationship between data rate and amplitude ratio t1/t2 may be registered and recorded or stored at operation 1260. Operations 1230 to 1260 may be repeated until it is determined at operation 1270 that data rates for all values of Z have been recorded.

It will be seen from equation (18) that the amplitude ratio t1/t2 according to embodiments of the invention is based on the receive relative amplitude setting B12, and the receive relative phase setting $\theta 12$ as well as the receive/transmit phase setting difference $\Phi 12$. Also according to embodiments of the invention, the receive relative amplitude setting B12, and the receive relative phase setting $\theta 12$ are newly determined, for example based on channel estimation, for each iteration of operations 1250 and 1260, transmitting and recording data rate.

Following this "blind search", the lowest registered data rate may be identified and the corresponding amplitude ratio defined as the amplitude ratio setting for the transmit null. This may also be referred to as amplitude "imbalance" and may be measured in dB.

Figure 13A:
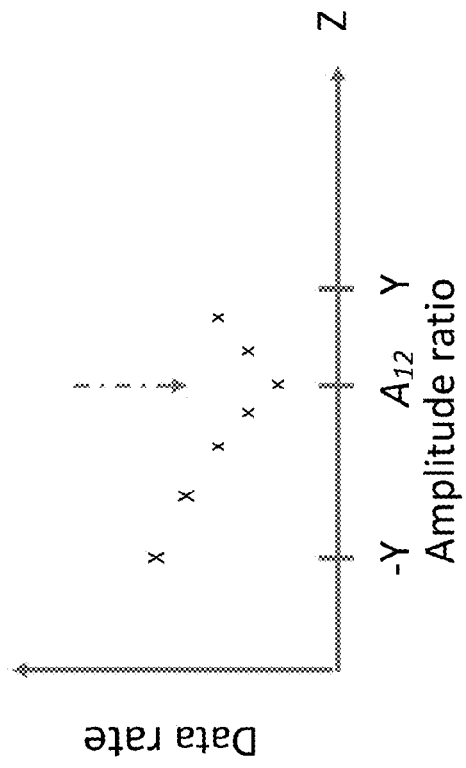
FIGS. 13A and 13B are graphs showing two different sets of results that may be obtained using the flow of FIG. 12, according to some embodiments of the present invention.

FIG. 13A shows an example of results that may be achieved from variation of amplitude ratio. Note that if Z=Y (or −Y), i.e. the minimal data rate occurs on the edge of, or outside, the expected range, the range of Z may be extended until a minimum appears. The data shown in this figure has a clear minimum from which the amplitude ratio for the transmit null may be determined.

Figure 13B:
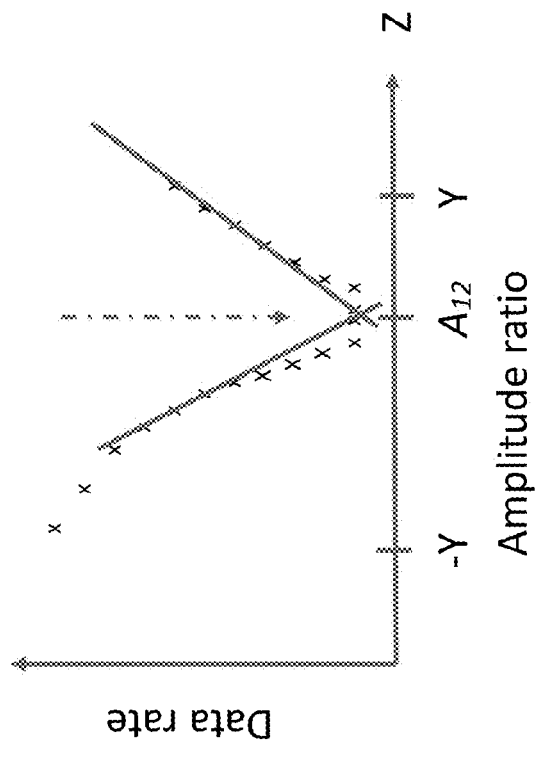

FIG. 13B shows an example set of results with more than one minimum data rate, such as might occur due to system limitations, or data transmission being unsuccessful, due to low SNR at the null, where the "slope method" may be used to extrapolate the virtual minimum data rate and corresponding amplitude ratio.

It will be appreciated from the foregoing that having determined amplitude ratios or relative amplitudes r1/r2 and t1/t2 for transmit and receive, it is useful also to determine the difference between these two ratios, r1/r2 minus t1/t2, to be used as a weight setting difference between transmit and receive antenna patterns, in order to match the patterns and achieve a null at the base station 1150.

Figure 14:
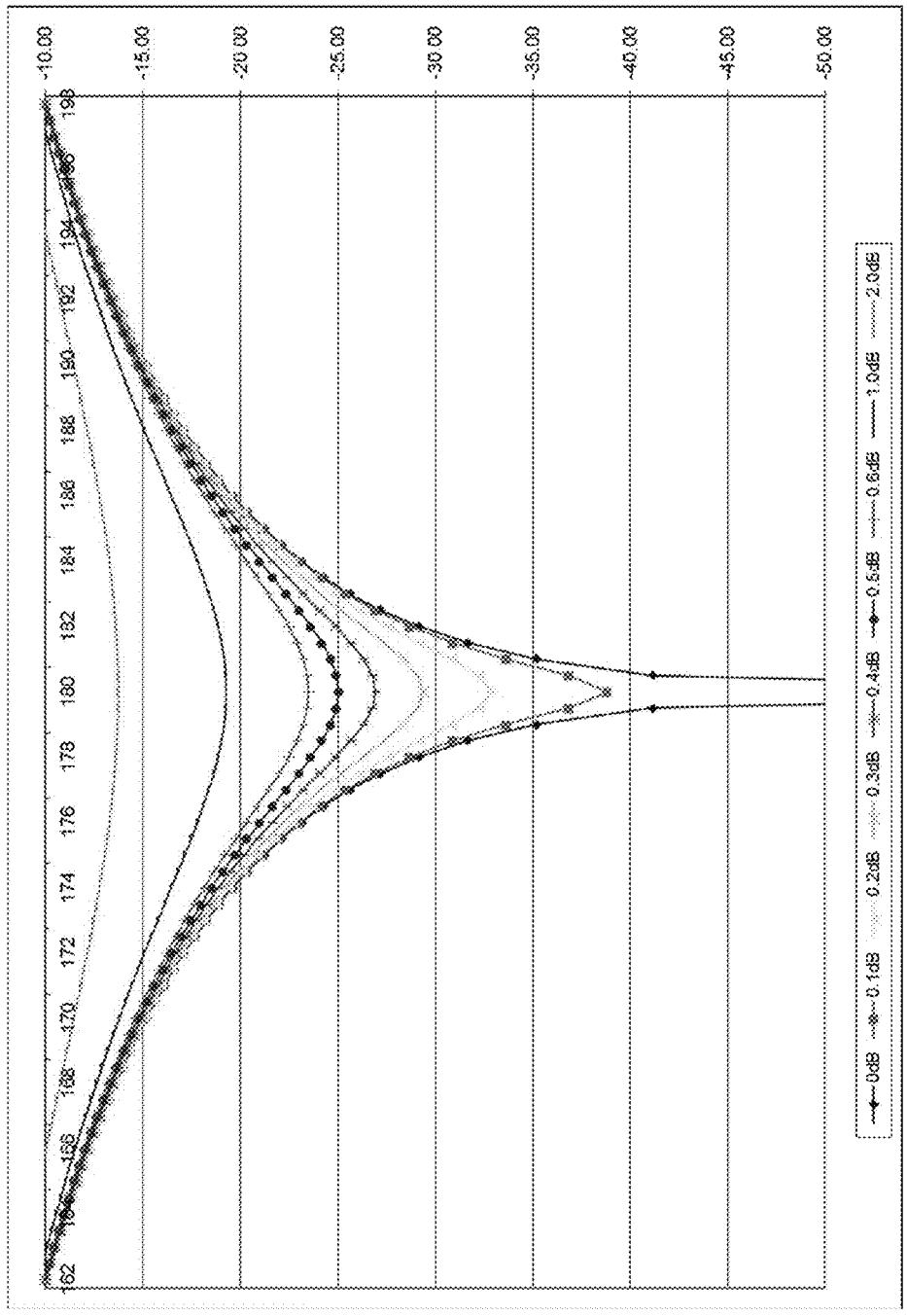
FIG. 14 is a graph showing the effect of variation of amplitude ratio on received signal strength according to some embodiments of the present invention.

FIG. 14 is a graph illustrating the effect of the variation of amplitude ratio on the received signal strength. In the figure, the x axis represents relative phase in degrees between two signals and the y axis represents signal strength relative to the peak, measured in dB. The different curves represent the relationship between signal strength of the combined signal and relative phase for different relative amplitudes measured in dB. Thus for example the relationship at 0 dB, which is not possible to achieve in practice, results in a null at infinity, and the other curves show that a difference of only 0.1 dB in relative amplitude can make a difference of a higher order in strength of the combined signal.

The determination of relative amplitude in the manner described above, using feedback from the other station where the null is to be achieved, may be performed by suitable configuration of the baseband processor without the need for any additional hardware.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." For example, a baseband processor or other processor may be configured to carry out methods of the present invention by for example executing code or software.

The aforementioned flowcharts and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of calibrating a station in a communications network comprising at least two antennas configured to operate together for both transmitting and receiving modes, and a plurality of radio circuits configured to transmit and receive via said antennas in a time division duplex (TDD) communication protocol, the method comprising:
  determining, by a processor, a phase setting difference between transmit and receive antenna patterns of said at least two antennas operating together, if the signals received from another station have a minimum signal strength then the receive antenna patterns are measured, and the transmit antenna patterns are determined based on a transmit data rate to another station;
  using, by the processor, said phase setting difference to determine one or both of: a relative amplitude setting for transmit antenna patterns, and a relative amplitude setting for receive antenna patterns; and
  calibrating the station by adjusting, by the processor, one or both of: each transmit antenna pattern transmitted by the station by the relative amplitude setting for the transmit antenna patterns, and each receive antenna pattern received by the station by the relative amplitude setting for the receive antenna patterns.

2. The method of claim 1 comprising using, by the processor, said phase setting difference to determine both of the relative amplitude setting for the transmit antenna pattern and the relative amplitude setting for the receive antenna pattern; and further comprising:
  determining, by the processor, an amplitude setting difference between transmit and receive antenna patterns as the difference between said relative amplitude settings.

3. The method of claim 1 wherein the determination of the phase setting difference is based on the difference between nulls in the transmit and receive antenna patterns.

4. The method of claim 1 comprising determining, by the processor, a relative amplitude setting for the receive antenna pattern and using the relative amplitude setting for the receive antenna pattern to determine the relative amplitude setting for the transmit antenna pattern.

5. The method of claim 1 wherein the relative amplitude setting for the receive antenna pattern is determined for nulling a signal received at said at least two antennas from another station in the communications network.

6. The method of claim 1 wherein the relative amplitude setting for the transmit antenna pattern is determined for nulling a signals transmitted by said at least two antennas to another station in the communications network.

7. The method of claim 1 wherein the determination of the relative amplitude setting for the receive antenna pattern is based on channel estimation on signals received by said at least two antennas from another station in the communications network.

8. The method of claim 1 wherein the determination of the relative amplitude setting for the transmit antenna pattern comprises:
   transmitting signals from the at least two antennas using a predetermined relative amplitude;
   recording a data rate corresponding to said transmitted signals;
   repeating said transmitting and recording for a range of different relative amplitudes; and
   determining the relative amplitude setting for the transmit antenna pattern as the relative amplitude corresponding to a minimum data rate of all recorded data rates.

9. The method of claim 8 comprising determining, by the processor, the relative amplitude setting for the receive antenna pattern prior to the transmission of signals, wherein the relative amplitudes used for said transmitting are determined based on the relative amplitude setting for the receive antenna pattern.

10. The method of claim 8 comprising determining, by the processor, a relative phase setting for the receive antenna pattern prior to the transmission of signals, wherein the predetermined relative amplitudes used for said transmitting are determined based on the relative phase setting for the receive antenna pattern.

11. The method of claim 10 wherein the relative phase setting for the receive antenna pattern is determined based on channel estimation.

12. A system comprising:
   a plurality of antennas configured to operate together for both transmitting and receiving,
   a plurality of radio circuits configured to transmit and receive via said antennas in a time division duplex (TDD) communication protocol; and
   a baseband processor configured to:
     determine a phase setting difference between the transmit and receive antenna patterns of said at least two antennas operating together if the signals received from another station have a minimum signal strength then the receive antenna patterns are measured, and the transmit antenna patterns are determined based on a transmit data rate to another station;
     use said phase setting difference to determine one or both of: a relative amplitude setting for transmit antenna patterns, and a relative amplitude setting for receive patterns; and
     calibrate the station by adjusting one or both of: (a) each transmit antenna pattern transmitted by the station by the relative amplitude setting for the transmit antenna patterns, and (b) each receive antenna pattern received by the station by the relative amplitude setting for the receive antenna patterns.

13. The system of claim 12 wherein the baseband processor is further configured to use said phase setting difference to determine both of the relative amplitude setting for the transmit antenna pattern and the relative amplitude setting for the receive antenna pattern; and determine an amplitude setting difference between transmit and receive antenna patterns as the difference between said relative amplitude settings.

14. The system of claim 12 wherein the baseband processor is configured to determine the phase setting difference based on the difference between nulls in the transmit and receive antenna patterns.

15. The system of claim 12 wherein the baseband processor is configured to determine a relative amplitude setting for the receive antenna pattern and use the relative amplitude setting for the receive antenna pattern to determine the relative amplitude setting for the transmit antenna pattern.

16. The system of claim 12 wherein the baseband processor is configured to determine the relative amplitude setting for the receive antenna pattern for nulling a signal received at said at least two antennas from another station in the communications network and to determine the relative amplitude setting for the transmit antenna pattern for nulling signals transmitted by said at least two antennas to another station in the communications network.

17. The system of claim 12 wherein the baseband processor is configured to determine the relative amplitude setting and the relative phase setting for the receive antenna pattern based on channel estimation on signals received by said at least two antennas from another station in the communications network.

18. The system of claim 12 wherein the baseband processor is configured to determine the relative amplitude setting for the transmit antenna pattern by:
   transmitting signals from two antennas using a predetermined relative amplitude;
   recording a data rate corresponding to said transmitted signals;
   repeating said transmitting and recording for a range of different relative amplitudes; and
   determining the relative amplitude setting for the transmit antenna pattern as the relative amplitude corresponding to a minimum data rate of all recorded data rates.

19. The system of claim 18 wherein the baseband processor is configured to determine the relative amplitude setting for the receive antenna pattern prior to the transmission of signals, wherein the predetermined relative amplitudes used for said transmitting are determined based on the relative amplitude setting for the receive antenna pattern.

20. The system of claim 18 wherein the baseband processor is configured to determine a relative phase setting for the receive antenna pattern prior to the transmission of signals, wherein the predetermined relative amplitudes used for said transmitting are determined based on the relative phase setting for the receive antenna pattern.

21. A method of calibrating a station in a communications network comprising at least two antennas configured to operate together for both transmitting and receiving modes, and a plurality of radio circuits configured to transmit and receive via said antennas in a time division duplex (TDD) communication protocol, the method comprising:
   using, by a processor, a predetermined phase difference between receive and transmit antenna patterns, if the signals received from another station have a minimum signal strength then the receive antenna patterns are measured, and the transmit antenna patterns are determined based on a transmit data rate to another station, for at least two antennas operating together, to determine one or both of: a relative amplitude setting for transmit antenna patterns and a relative amplitude setting for receive antenna patterns, to achieve a null in a signal received from or transmitted to another station by said at least two antennas; and calibrating the station by adjusting, by the processor, one or both of: a) each transmit antenna pattern transmitted by the station by the relative amplitude setting for the transmit antenna patterns, and each receive antenna pattern received by the station by the relative amplitude setting for the receive antenna patterns.

* * * * *